(12) United States Patent
Kohn et al.

(10) Patent No.: US 9,474,197 B2
(45) Date of Patent: Oct. 25, 2016

(54) UNIVERSAL CUSTOM AGRICULTURAL FIELD PREPARATION IMPLEMENT

(71) Applicant: McFarlane Manufacturing Co., Inc., Sauk City, WI (US)

(72) Inventors: Rick Kohn, Prairie du Sac, WI (US); Jeffrey Martin Marggi, Oregon, WI (US); Aaron J. Faessler, Cross Plains, WI (US); Stanley Edmund McFarlane, Sauk City, WI (US)

(73) Assignee: McFarlane Manufacturing Co., Inc., Sauk City, WI (US)

( * ) Notice: Subject to any disclaimer, the term of this patent is extended or adjusted under 35 U.S.C. 154(b) by 184 days.

(21) Appl. No.: 14/216,642

(22) Filed: Mar. 17, 2014

(65) Prior Publication Data

US 2014/0262370 A1     Sep. 18, 2014

Related U.S. Application Data

(60) Provisional application No. 61/799,176, filed on Mar. 15, 2013.

(51) Int. Cl.
*A01B 49/02*     (2006.01)
*A01B 63/24*     (2006.01)

(52) U.S. Cl.
CPC ............. *A01B 49/027* (2013.01); *A01B 63/24* (2013.01); *Y02P 60/144* (2015.11)

(58) Field of Classification Search
CPC .... A01B 49/02; A01B 49/027; A01B 63/00; A01B 63/002; A01B 63/008; A01B 63/10; A01B 63/111; A01B 63/24

USPC ....... 172/383, 384, 452, 458, 460, 468, 469, 172/473, 474, 482, 488, 138, 141, 145, 146

See application file for complete search history.

(56) References Cited

U.S. PATENT DOCUMENTS

| 467,400 A | 1/1892 | Denney et al. |
| 471,209 A | 3/1892 | Cordes |
| 1,747,052 A | 2/1930 | Cody |

(Continued)

FOREIGN PATENT DOCUMENTS

| FR | 821621 | 5/1937 |
| GB | 2136463 | 10/1984 |

OTHER PUBLICATIONS http://www.landoll.com/ag/PDF/7430%20VT%20Plus.pdf.

(Continued)

*Primary Examiner* — Jamie L McGowan
(74) *Attorney, Agent, or Firm* — Boardman & Clark LLP

(57) ABSTRACT

A multi-task single-pass agricultural tillage implement has a plurality of independently engageable and adjustable soil working components successively mounted on a mainframe. The mainframe has a wheel assembly which raises and lowers a plurality of wheels. The mainframe also includes a tongue assembly coupleable to a towing vehicle and a frame pivoting angle adjustment mechanism. Each of the soil working components can be independently and selectively operated separately or in combination with any one or more of the plurality of working components such that each of the plurality of soil working components is independently, selectively operated for optimized single pass tillage. An open spiral chopping reel assembly for use in an agricultural field preparation implement is also disclosed.

12 Claims, 27 Drawing Sheets

(56) References Cited

U.S. PATENT DOCUMENTS

| | | | |
|---|---|---|---|
| 2,994,388 | A | 8/1961 | Ryan |
| 3,090,447 | A | 5/1963 | Hotchkiss, Jr. |
| 4,127,178 | A | 11/1978 | Blair |
| 4,131,163 | A | 12/1978 | Bezzerides |
| 4,180,005 | A | 12/1979 | Zumbahlen |
| 4,212,254 | A | 7/1980 | Zumbahlen |
| 4,245,706 | A | 1/1981 | Dietrich, Jr. |
| 4,250,970 | A | 2/1981 | Pfenninger et al. |
| 4,313,503 | A | 2/1982 | Good et al. |
| 4,361,191 | A | 11/1982 | Landoll et al. |
| 4,444,271 | A * | 4/1984 | Dietrich, Sr. ......... A01B 49/02 172/140 |
| 4,703,810 | A | 11/1987 | Meiners |
| 5,052,495 | A | 10/1991 | McFarlane et al. |
| 5,207,279 | A | 5/1993 | Nelson et al. |
| 5,474,135 | A | 12/1995 | Schlagel |
| 5,544,709 | A | 8/1996 | Lowe et al. |
| 5,622,227 | A | 4/1997 | McDonald |
| 5,632,343 | A | 5/1997 | Gengler |
| 5,806,605 | A * | 9/1998 | Keigley ................. E02F 3/7622 172/145 |
| 5,855,245 | A * | 1/1999 | Gerein ................... A01B 73/00 172/328 |
| 6,035,943 | A * | 3/2000 | Gerein ................... A01B 63/22 172/328 |
| 6,209,657 | B1 * | 4/2001 | Friggstad ............. A01B 73/065 172/322 |
| 6,554,078 | B1 | 4/2003 | McDonald |
| 6,557,646 | B1 | 5/2003 | Hurtis et al. |
| 6,612,381 | B2 | 9/2003 | Powell et al. |
| 6,698,525 | B2 | 3/2004 | McFarlane |
| 6,896,068 | B2 | 5/2005 | Dietrich et al. |
| 7,017,675 | B2 | 3/2006 | Ankenman et al. |
| 7,188,680 | B2 | 3/2007 | Almen |
| 8,020,629 | B1 * | 9/2011 | McFarlane ............. A01B 21/08 172/145 |
| 8,627,898 | B2 * | 1/2014 | Nance .................... A01B 23/06 172/146 |
| 2003/0085044 | A1 | 5/2003 | McFarlane |
| 2004/0149459 | A1 | 8/2004 | Powell et al. |
| 2005/0173135 | A1 | 8/2005 | Almen |
| 2013/0199807 | A1 * | 8/2013 | Hoffman ............. A01B 49/027 172/1 |

OTHER PUBLICATIONS http://www.discplough.com/productlist.html.
Windsor Prior Art Date Documentation.
AMCO Products, "Super-Till is the Ultimate . . . ", Yazoo City, Mississippi.
Degelman Industries, Ltd., "Strawmaster", Saskatchewan, California.
McFarlane Mfg. Co., Inc., "Spiral Reel Stalk Chopper", Sauk City, Wisconsin.
"Farm Equipment", Nov./Dec. 2001, Cover and p. 32.
Bigham Brothers, Inc., "VersaTill: Maximum Tillage Versatility," printout from website, http://bighambrothers.com/versatil.htm, Nov. 8, 2001, p. 4.
"Sunflower", website pp. 1-4, http://www.sunflower-mfg/products/6000features.asp, Mar. 2, 2007.
Gates Manufacturing Inc., "Magnum Coulter Disks", www.gatesmfg.net/productspage/coulterdisk.htm, printed Sep. 23, 2010.

* cited by examiner

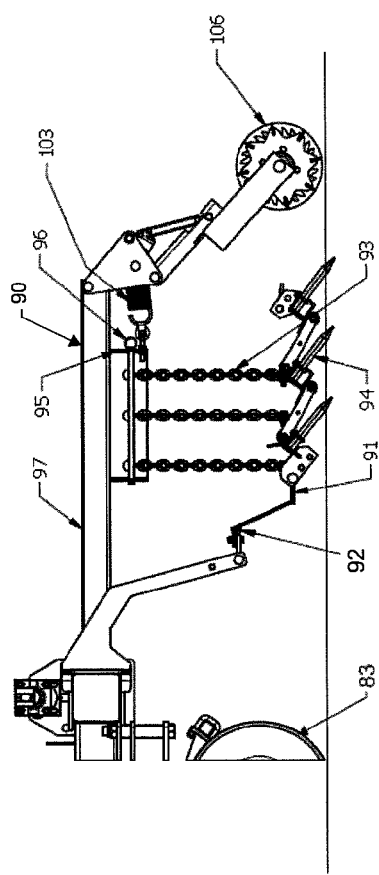
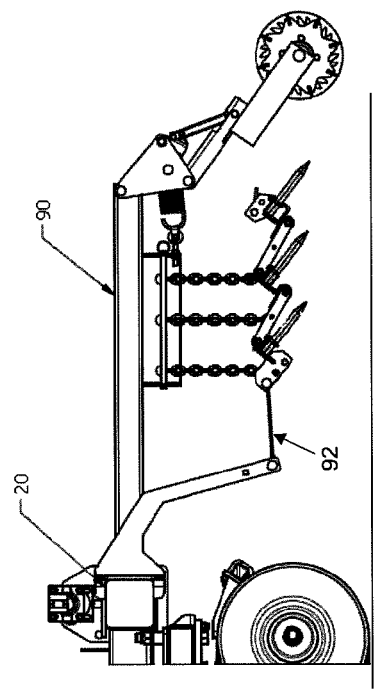

UNIVERSAL CUSTOM AGRICULTURAL FIELD PREPARATION IMPLEMENT

CROSS-REFERENCE TO RELATED APPLICATION

This application claims priority to U.S. Provisional Application Ser. No. 61/779,176, filed Mar. 15, 2013, entitled "Universal Custom Field Preparation Implement," the content of which is hereby incorporated in its entirety herein.

BACKGROUND OF THE INVENTION

1. Field of the Invention

The present disclosure relates to an implement for use in multi-task tillage of agricultural fields. More particularly, it relates to a universal custom field preparation implement which can be selectively optimized for specialized post-harvest tillage, fall tillage, spring aeration and/or tillage, one-pass tillage for seed bed preparation, and selective broadcast soil entrainment of seed for non-row crops and cover crops, and granular fertilizer, lime, herbicides, pesticides, and the like, for general soil conditioning.

2. Background of the Invention

Agricultural field soil tillage is dependent upon many variables, including seasonal activities, such as spring tillage, preparation of seed beds for receiving fertilizer and seed for a variety of crops to be planted, post-harvest summer and fall tillage, crop residue size reduction and soil incorporation, soil preparation for summer or fall seeding of cover and winter crops, late fall tillage to prepare the soil for winter conditions, including freezing, thawing, wind, water, and snow cover conditions, and early spring tillage to open, mix, and warm the soil in preparation for early season planting activities. Additionally, soils vary in type, from sand to loam, to heavier soil with varying clay contents, to rocky, which different soil types each have varying drainage and heating/cooling characteristics. Tillage conditions vary greatly, depending on the previous cropping history of the land, ranging from little or very light crop residue to growing cover crop, to legume and grass sods, to very heavy crop residue such as after corn harvest by combine. Recently developed crop varieties have increased resistance to attack by insects, fungi, and disease. However, the residue from these plants also show decreased levels of degradation after harvest, with both increased root residue, accompanied by soil clods formed around the root remnants, and tough fibrous stalks which are more resistant to cutting and slicing implements. Increasingly, as farming operators are able to increase the amount of acreage they till to optimize their use of and investment in larger and more efficient tractors and machinery, individual farm businesses may be tilling fields separated by considerable distances, with fields located 30 and even 50 miles or more from the operator's home base, thereby increasing the likelihood that any given farm operator may be experiencing many different soil conditions in any season. Furthermore, such widely dispersed soil tillage during any season of the year greatly increases the likelihood that the farm operator will experience most or all of such variable conditions, including widely disparate wet and dry conditions, during a tillage season, often during the same day. Accordingly, many implements which are highly effective under one set of conditions may be not nearly as effective or totally ineffective under different variable conditions.

The need to perform effective soil tillage under such widely varying soil, weather, and crop residue conditions on an almost daily basis has financial implications for such operators. Tillage implements have become increasingly complex in order to carry out single-pass tillage. Such complexity results both from longer implements which carry a variety of implement components over and through the soil for different, successive tillage treatments, to wider implements which enable one tractor to pull implements having tilling widths as wide as up to 45 feet or more. Such implements both minimize the number of trips the tractor must make across a given field, and increase the acreage which can be covered with a single tillage implement during a work day or tillage season in which the amount of land a farm operation can till is directly dependent upon the number of limited hours of available tillage time. For the mobile farmer, implement width is usually limited by the extent to which the width of the implement can be reduced for over-the-road travel by the hinging capability of the implement to pivot and position side wings of the implement over a central, wheeled-carriage main body section to a permissible "wide-load" size which can be transported over available highways. Increasingly, a farm operator may find a need to purchase several costly complex implements to optimize the effectiveness of his tillage under all of the variable soil, residue, weather, and crop types and varieties with which he is engaged. Conversely, implements which include multiple aggressive soil tillage implement components may not be efficient or desirable when less aggressive tillage, requiring less power and fuel, may be adequate.

Accordingly, a need exists for a universal custom field preparation implement which can effectively and efficiently optimize tillage capabilities for a wide variety of soil and seasonal tillage requirements.

SUMMARY

An exemplary embodiment relates to a universal custom field preparation implement comprising a one-pass agricultural tillage implement having a plurality of soil working components successively mounted on a mainframe which can be supported by a plurality of support wheel assemblies coupled to the mainframe having support wheels which can be hydraulically lowered to elevate the components above ground level for transport without engagement of the soil working components over agricultural lands or highways. The mainframe is connected at its from end to a framed tongue assembly which may be connected at its front end to the drawbar of a tractor which can power and control movement of the implement. The wheels can be raised in a controlled manner to lower the frame and components to engage the soil at depths controlled in part by the support wheels, or further raised whereby the depth of engagement of the components is controlled by the weight and configuration of the frame and components and by the engagement of a selected one or more of the components with the soil to be worked by the implement. The soil working components supported by the mainframe of the implement may advantageously include a plurality of front disc gangs which are configured with typically outwardly cupped shallow or ultra-shallow concave discs for varying degrees of "minimal" or "vertical" tillage, with the disc gangs being adjustable between about 0 degrees to 13 or more degrees, as measured with respect to frame members extending perpendicular to the path of travel of the implement, such that the individual disc blades, the edges of which are aligned perpendicularly to the angle of the disc gangs, may engage the soil at angles of approximately 0 degrees to 13 or more degrees to the direction of travel. A line of plural chopping reel assemblies, each reel having a plurality of shallow helical blades extending generally longitudinally of the gangs, is supported by the mainframe closely behind the front disc gangs, to provide vertical chopping or slicing of the soil and vegetation lying on the top of the soil at an angle perpendicular to the line of travel. The chopping reel assemblies are hydraulically actuated to permit the chopping reels to be lowered for controlled depth soil engagement or raised independently of the other working components. The support wheels assemblies are positioned on the mainframe immediately behind the chopping reel assemblies. The support wheel assemblies are followed by a plurality of rear disc gangs generally similar to the front disc gangs except that the shallow discs are typically cupped inwardly toward the center of the mainframe and offset slightly from the front discs to inwardly displace soil displaced outwardly by the front discs so that the soil displaced by the two disc gangs generally ends up in the same area as it was originally encountered. The angle of the rear disc gangs is independently adjustable within the approximate range of 0 degrees to 13 or more degrees with respect to perpendicular to the direction of travel. The rear disc gangs are minimally separated from the front disc gangs by a distance which permits adjustment of the angles of the disc gangs, and which also permits the chopping reel assemblies and the support wheel assemblies to be raised and lowered. The tongue assembly and mainframe may be adjusted to permit engagement of either the front disc gangs, or the rear disc gangs, without engagement of the other. Additionally, a plurality of harrow bar subassemblies are advantageously supported by the mainframe behind the rear disc gangs for smoothing the soil after the discs, and a plurality of pivoting rolling basket support arm assemblies extend from the mainframe to support a plurality of rolling baskets. Both the harrow bar subassemblies and the rolling baskets may be independently adjusted to determine the depth of soil engagement or non-engagement under various operating conditions and soil conditioning objectives. In other embodiments of the invention, the particular soil working components can be varied, with different soil engaging components positioned at the described component positions for different tillage treatments.

In another advantageous embodiment, the chopping reel assemblies may include open spiral chopping reels of the invention comprising self-cleaning hubs which support end plates whereby the plurality of helical blades are supported by and between the end plates with one or more annular reinforcement rings positioned between the end plates to structurally connect and reinforce the blades. The helical blades are each replaceable without disassembling the reel assembly. The hub assemblies can be accessed and replaced by removing just one blade from the reel.

In another advantageous embodiment, wing assemblies are pivotally attached to the mainframe to effectively double or triple the working width of the implement, with each wing assembly supporting each of the described soil working components.

BRIEF DESCRIPTION OF THE DRAWINGS

Various exemplary embodiments of the systems and methods according to this invention will be described in detail, with reference to the following figures, which bear notations helpful to understand the structure and functions of the illustrated parts, wherein like reference numbers refer to like parts:

FIG. 13 is a partial side view of the most rearward frame subassembly of the embodiment of FIG. 1, wherein three-bar harrow sections are schematically illustrated in an engaged position and a trailing, rolling basket is also shown in an engaged position.

FIG. 14 is a partial side view of the embodiment of the invention of FIG. 13, wherein the harrow sections and rolling basket are schematically illustrated in a disengaged position.

DETAILED DESCRIPTION OF EXEMPLARY EMBODIMENTS

Figure 1:
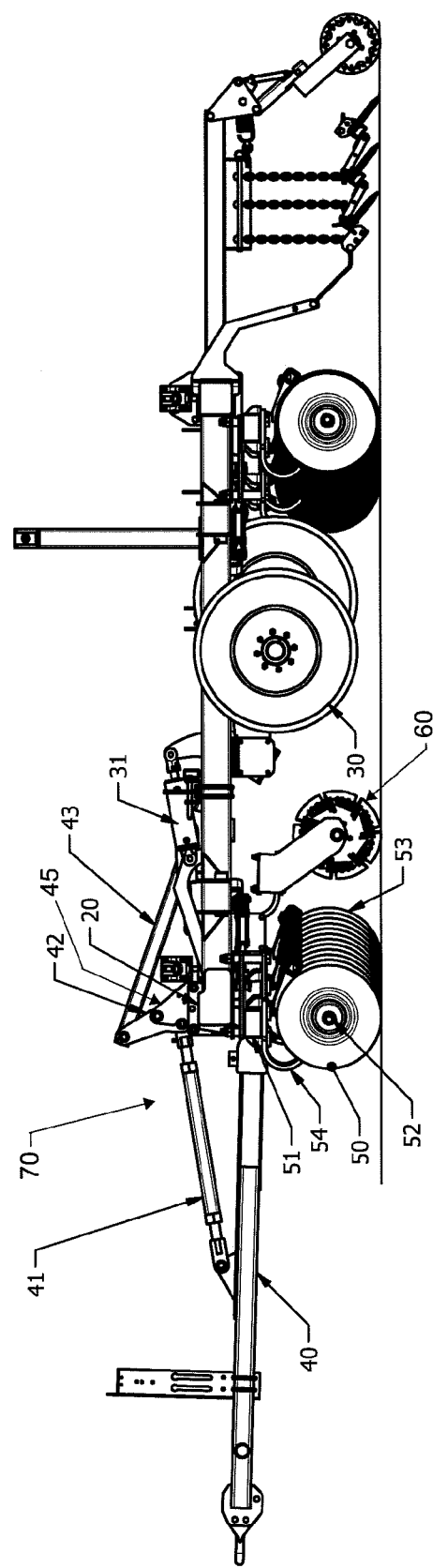
FIG. 1 is a side view of an exemplary embodiment of the universal custom field preparation implement of the invention, wherein the working components are positioned such that all components will be substantially equally engaged with the soil.

Referring more particularly to FIGS. 1-33, in which like numbers denote like parts, it is seen that an exemplary embodiment of the universal custom field preparation implement 70 of the present invention consists of a mainframe 20 comprised of welded square tubular steel sections. The mainframe 20 may support and/or be supported by a plurality of support wheel assemblies 30. The pivotable support wheel assemblies may be raised and lowered with respect to the mainframe 20 by means of hydraulic wheel actuators 31, which in turn are connected by hydraulic lines (not shown) to the hydraulic controls (not shown) of a tractor in a conventional manner. The mainframe 20 is connected at its front end to a framed tongue 40, as shown in FIGS. 1-8, and 18. The front end of tongue 40 may be connected to the drawbar of a tractor 45 in a conventional manner, as schematically shown in FIGS. 3-6. The various working and non-working positions of the working components of the universal custom field preparation implement 70 are partially described in the descriptions of FIGS. 1-8, above.

Figure 3:
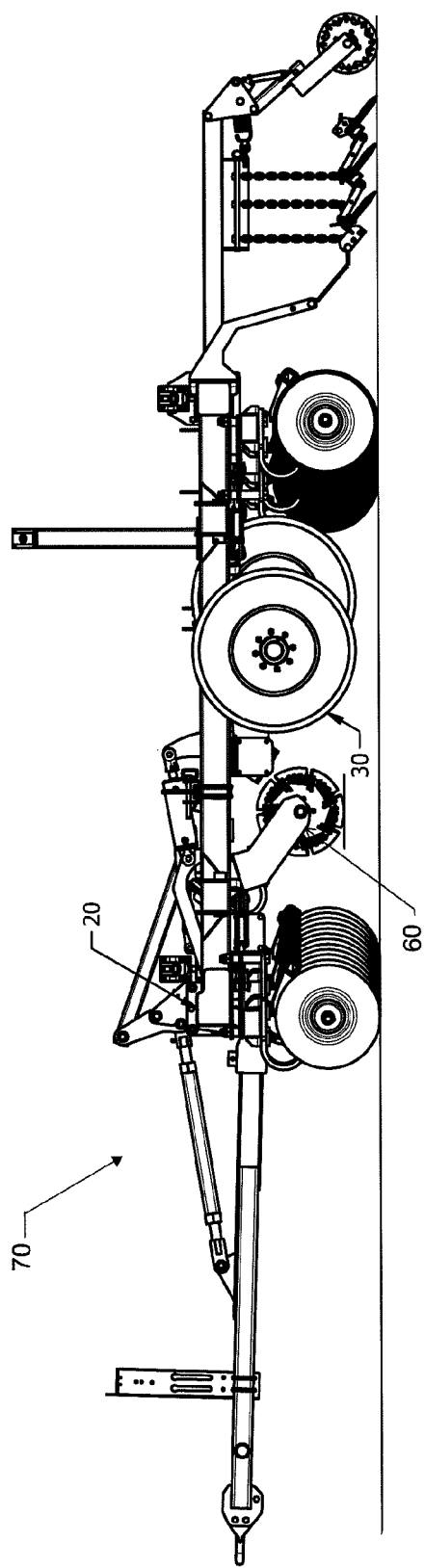
FIG. 3 is a side view of the exemplary embodiment of FIG. 1, wherein the chopping reel component of the invention is in a raised position, and all of the other working components are in a ground engaging position.
Figure 21:
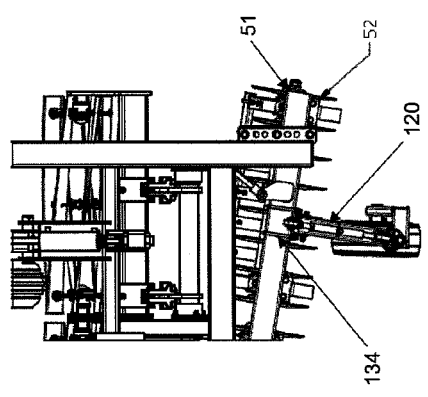
FIGS. 21 and 22 are additional partial views of an exemplary embodiment of the invention, showing the relationship between a wing frame and a front disc support beam of a front disc gang and wherein a front castoring gauge wheel is mounted to the disc support beam.
Figure 22:
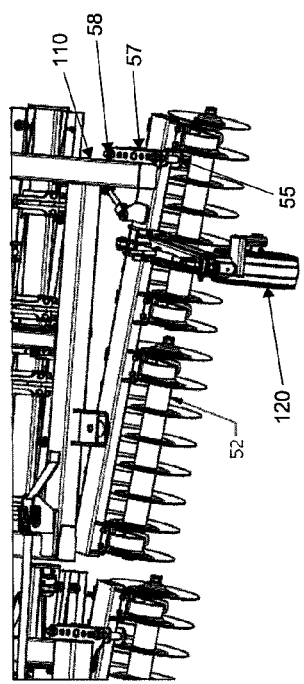
Figure 23:
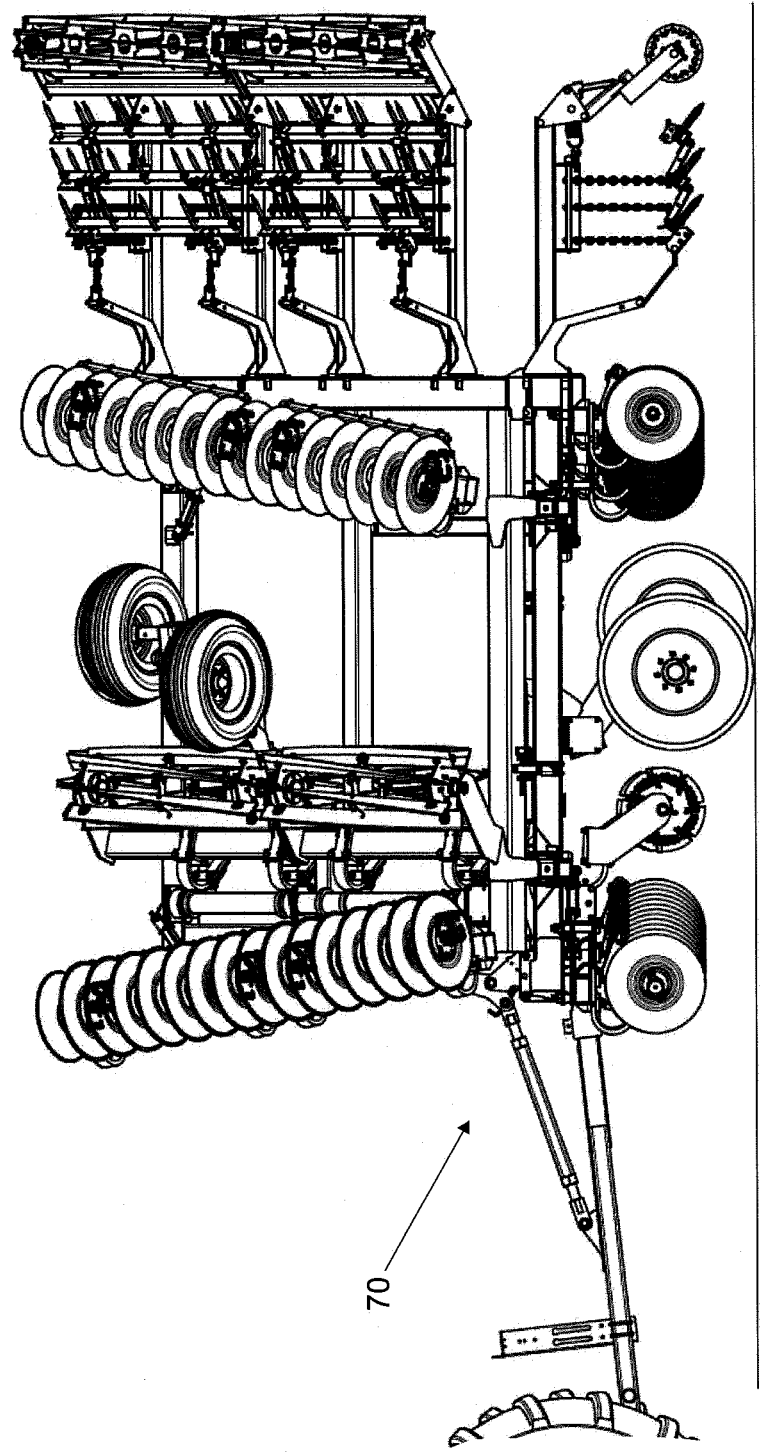
FIG. 23 is a side view of an embodiment of FIG. 1, wherein the support wheels of the mainframe have been lowered to elevate all of the implements up to a travel position, and wherein a wing assembly attached to the near side of the mainframe is shown folded upward and over the mainframe to reduce the width of the implement as required for transport of the implement on public highways.
Figure 24:
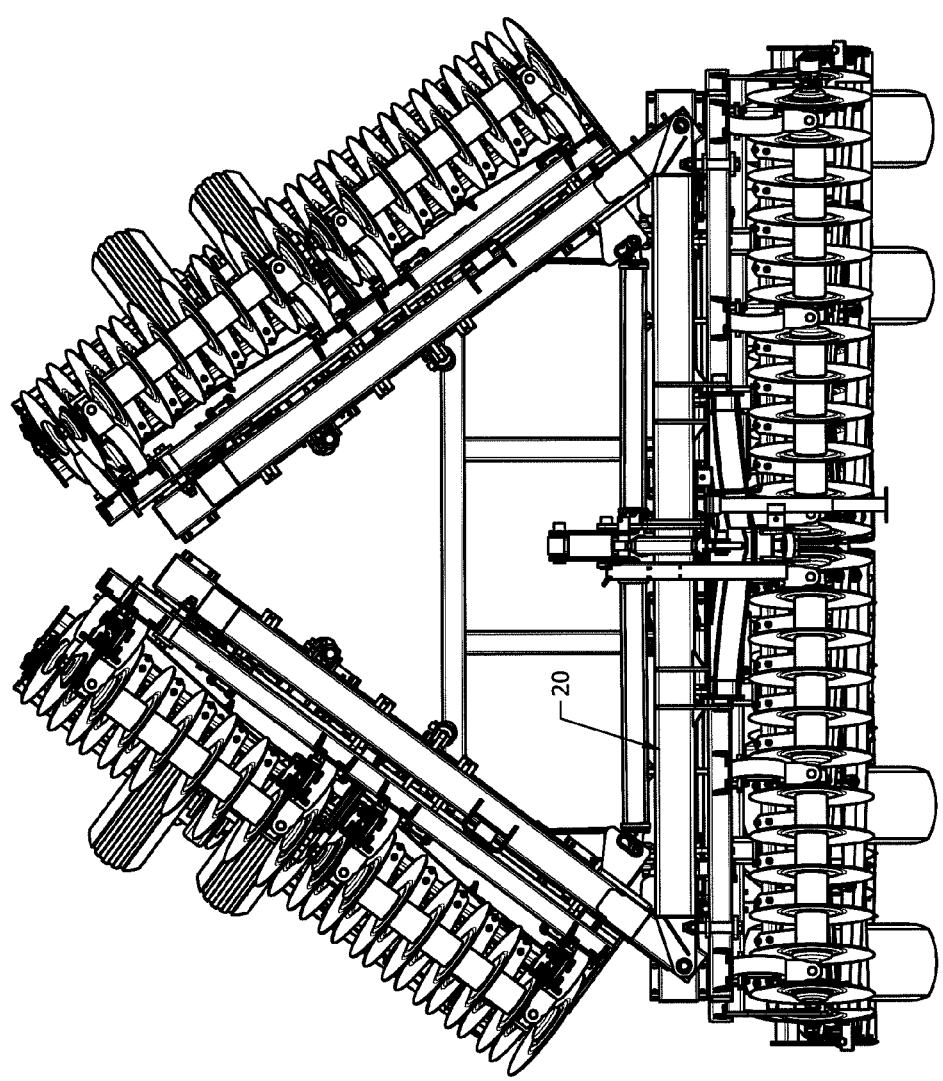
FIG. 24 is a front view of an exemplary implement such as that shown in FIG. 10, wherein each of the side wing assemblies have been pivoted upwardly into a dual-fold travel position to facilitate "wide-load" travel of the unit on public roads to provide access to widely separated working locations.
Figure 25:
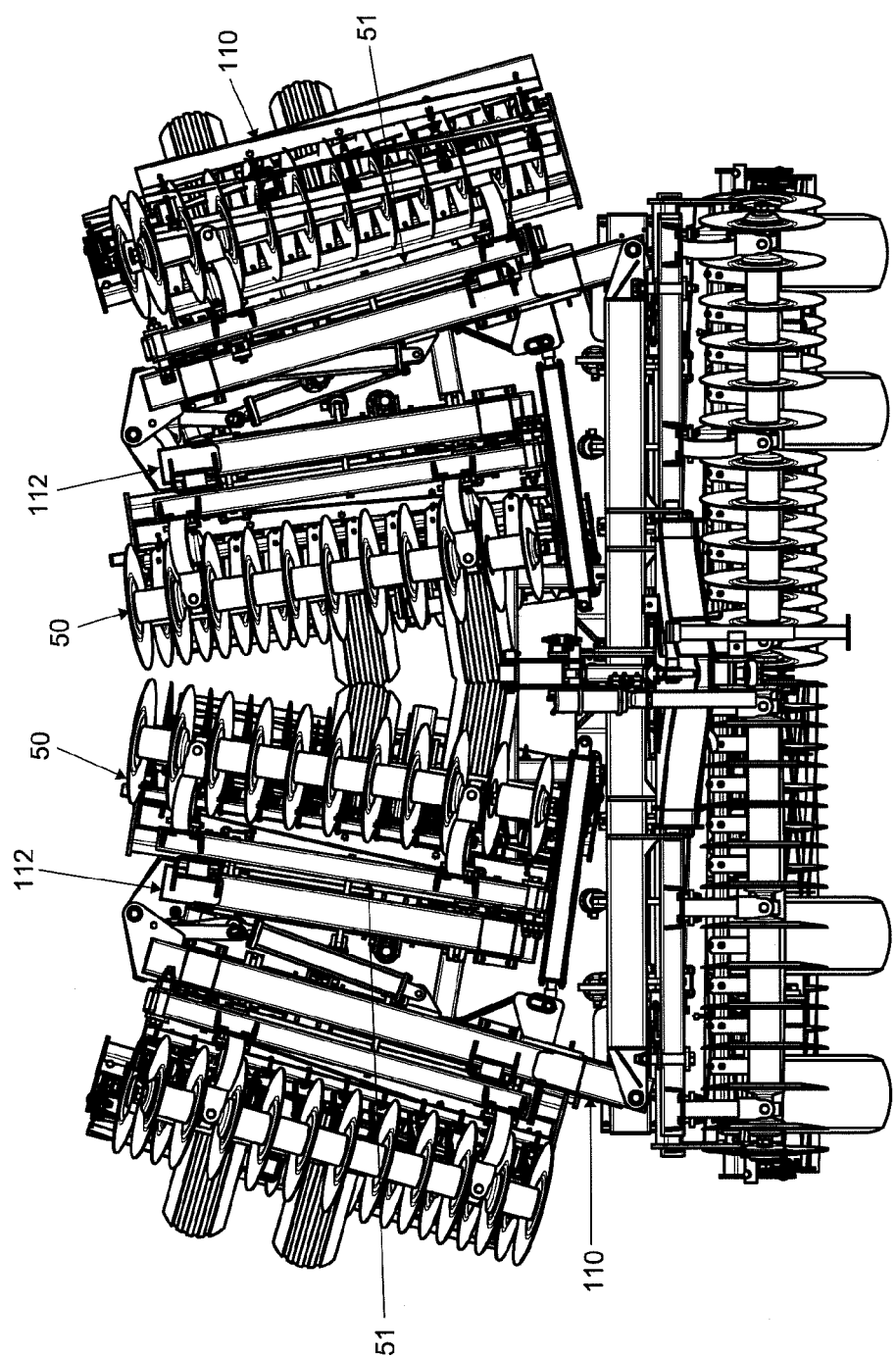
FIG. 25 is a front view of an exemplary embodiment of an implement similar to that shown in FIG. 24, wherein a second side wing assembly is pivotally attached to each first side wing assembly, pivotally attached to a side of the implement mainframe, illustrating the manner in which the two pivotally connected pairs of side wing assemblies are folded into a nearly parallel relationship, and wherein the parallel wing assemblies may then be pivoted to a travel position above the implement mainframe.

A plurality of front disc gangs 50 are connected to the front portion of the mainframe 20. The front disc gangs 50 may best be seen from FIGS. 10-12, where they are shown below the mainframe 20, and adjacent front frame portions of wing assemblies 110. Each front disc gang 50 comprises a front disc support beam 51, and front disc axle assembly 52 connecting a plurality of front discs 53 in spaced parallel relation. The front disc axle assemblies 52, best shown in FIGS. 21 and 22, are connected to the front disc support beams 51 by front C-spring connectors 54, as best shown in FIG. 3 of U.S. Pat. No. 8,020,629, the disclosure of which is incorporated herein by reference, or by any other conventional or later developed structure for supporting disc axle assemblies from disc support beams. The illustrated C-spring mounting of the front disc axle assemblies 52, and the disc blades 53 mounted thereon and affixed to the axles (not shown) in spaced relation, permits the disc assemblies to displace upwardly against the resilient C-springs in the event a rotating disc blade 53 strikes a rock or other hard object during operation, thereby preventing damage to the disc blades 53.

Figure 8:
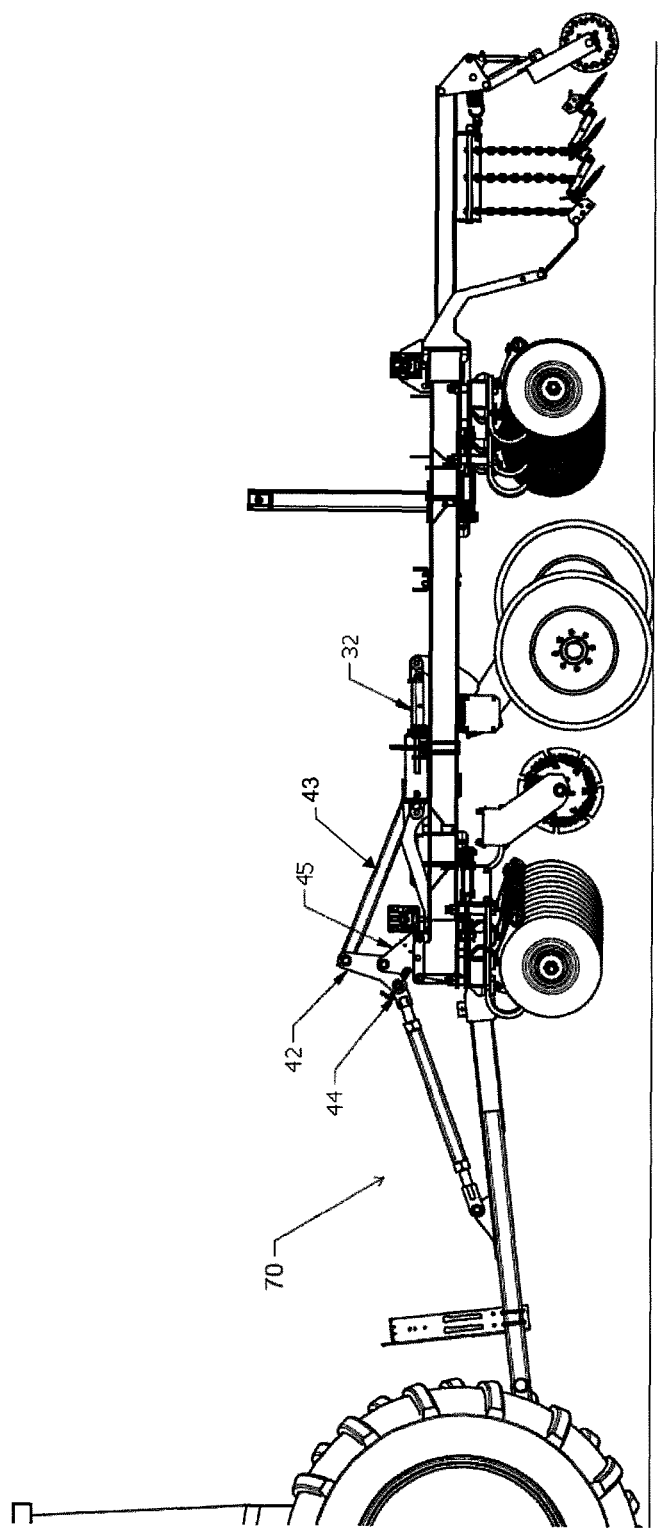
FIG. 8 is a side view of the exemplary embodiment of FIG. 1, wherein the transport wheels are lowered to raise the implement to headland or transport position.
Figure 9:
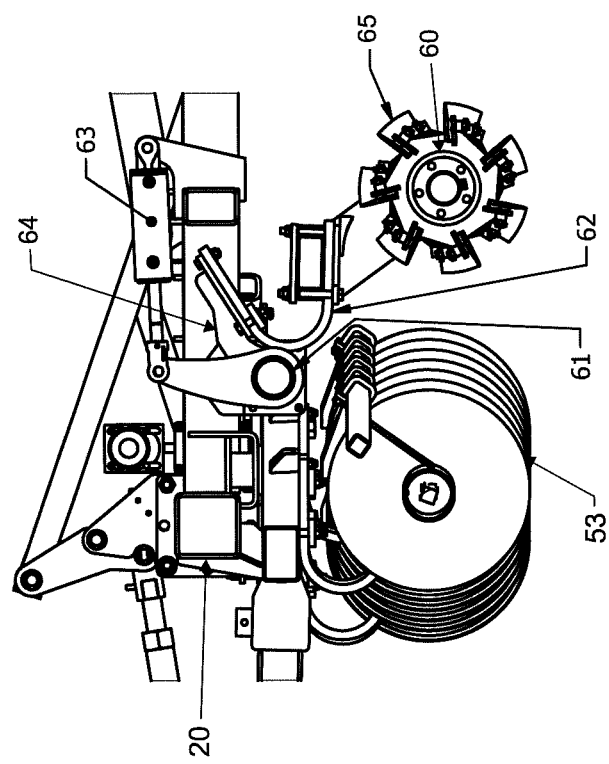
FIG. 9 is a partial side view of the embodiment of FIG. 1, wherein a pivotally mounted chopping reel is shown with an hydraulic actuator for pivoting the chopping reel about the axis of a frame mounted tubular jack shaft to various working positions between a fully lowered and a raised position, independently of the positions of the tongue or the other working components.
Figure 10:
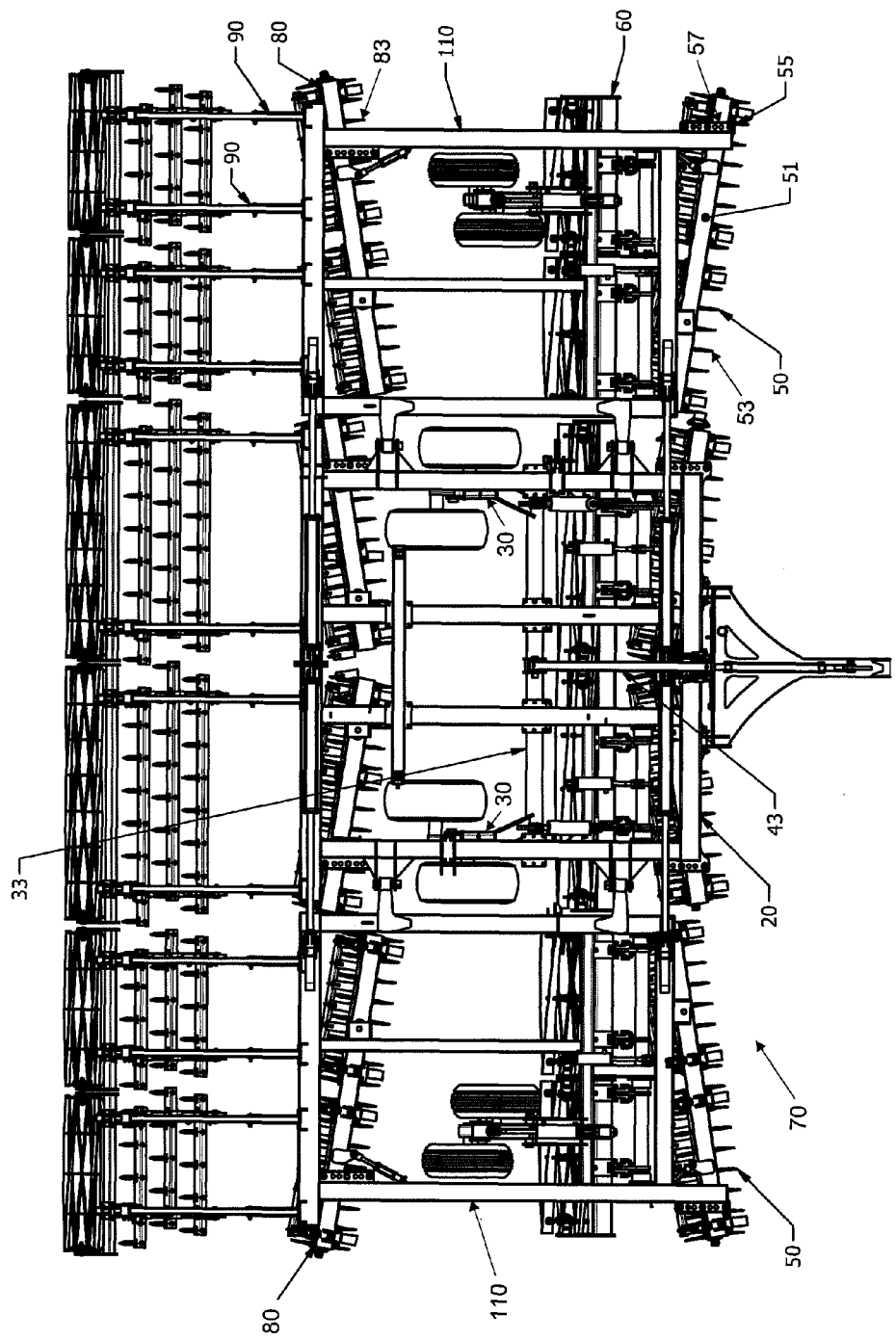
FIG. 10 is a partial top view of an exemplary embodiment of the present invention, including hydraulic actuated side wing assemblies hingedly attached to the mainframe to effectively double the working width of the implement and illustrating front and rear disc gangs angled for aggressive soil and residue management.
Figure 11:
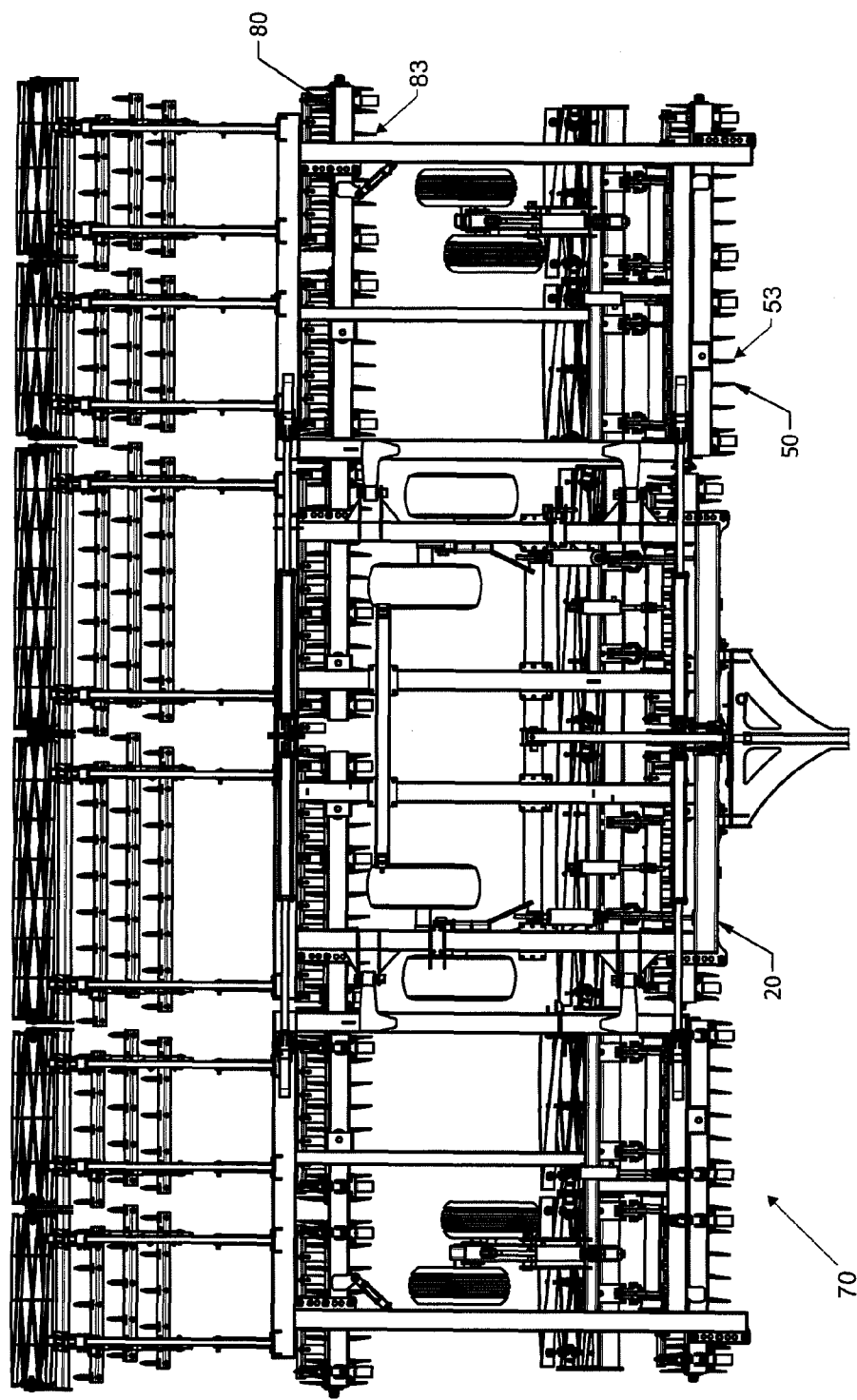
FIG. 11 is a partial top view of the embodiment of FIG. 10, wherein the front and rear disc gangs are illustrated positioned in low-angle, generally straight gang position with individual disc blades aligned nearly parallel to direction of travel for reduced horizontal soil disturbance.
Figure 12:
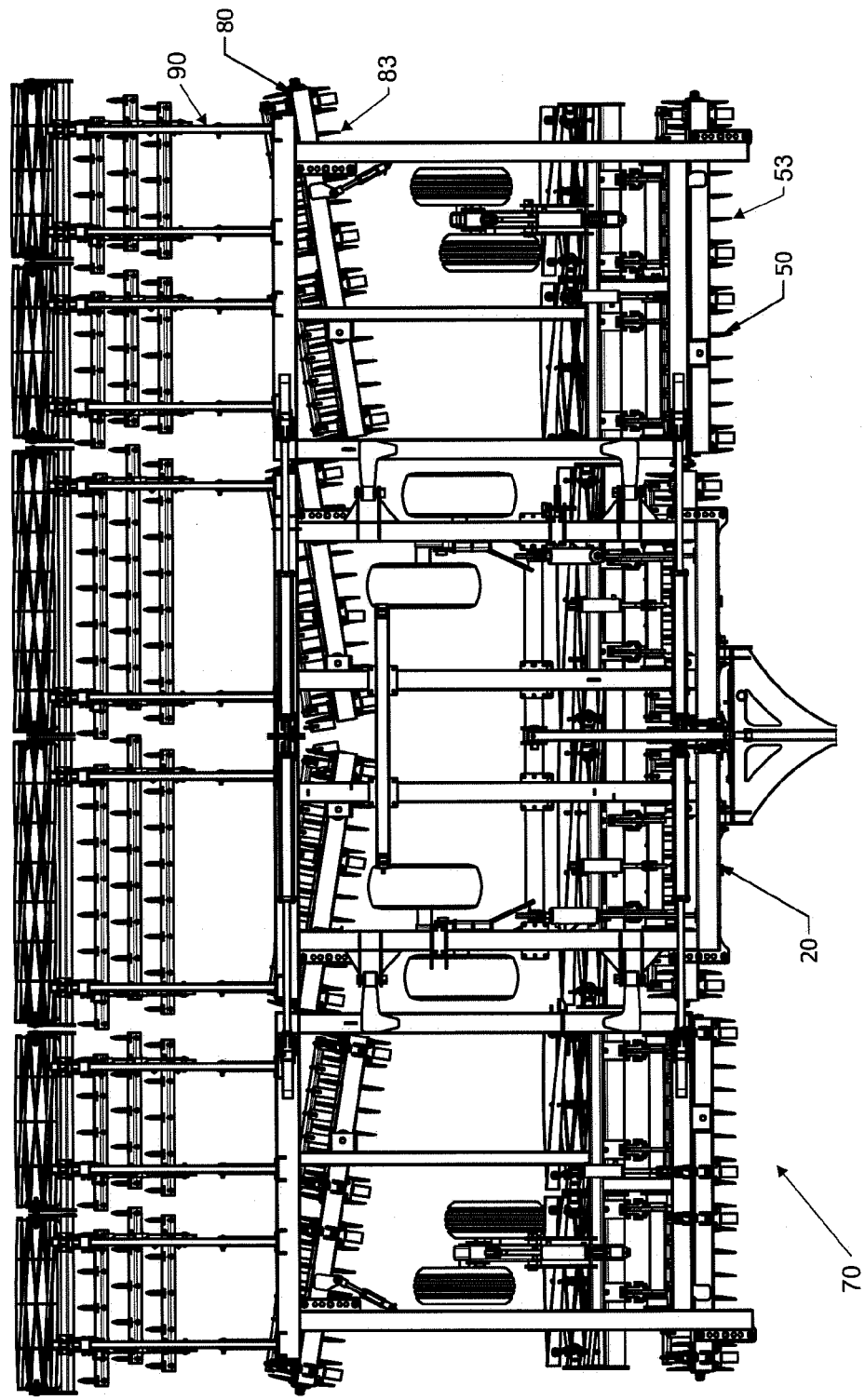
FIG. 12 is a partial top view of the embodiment of FIG. 10, wherein the front disc gangs are illustrated in a low-angle position for straight slicing and cutting action with minimal horizontal soil disturbance, and the rear disc gangs are illustrated at a more substantial angle for more aggressive horizontal soil disturbance and residue entrainment in the soil.

The structure, positioning and operation of the front disc gangs 50 can be best understood by reference to FIGS. 10-12, which provide top views of an exemplary embodiment of the invention as illustrated in FIGS. 1-10, and wherein left and right side wing assemblies 110 are shown hingedly attached to the mainframe 20 to substantially double the working width of the implement. The embodiment illustrated in FIG. 10 includes four front disc gangs 50 supported beneath the front end portions of mainframe 20 and wing assemblies 110. More specifically, the mainframe 20 supports two front disc gangs 50 in side-by-side relation, and each wing assembly supports one front disc gang 50 in general alignment with front disc gangs supported by the mainframe 20. As most fully shown on the right side of the top view of FIG. 10, support beam 51 for each front disc gang is pivotally attached to the frame of wing assembly 110 near its inside end. Its outside end is positioned in a more forward position by means of a U-clamp 55 extending around the support beam 51, with side bolts extending upwardly through selected holes in a support flange 57 extending outwardly from the side of the frame of the side wing assembly 110, and secured by threaded retainer nuts 58, as best shown in FIGS. 1-8, and FIG. 22. By such means the outer end of support beam 51 may be effectively clamped or contained in the desired operating position. Each of the front disc gangs 50 is schematically shown to be similarly attached to front portions of the mainframe 20 and opposite wing assembly frames as appropriate. It will be seen throughout the drawings that where there are multiple, similar implement components supported by the mainframe 20, wing assembly frames, or other illustrated structure, the drawings may show some of the connecting hardware and hydraulic or mechanical operators for illustrative purposes, whereas other similar components will be schematically shown in place. However, in practice and commercial use, all of the connecting hardware and operators would, of course, be present in a working embodiment of the invention. Likewise, the drawings do not include part numbers for all similar components, but all referenced part numbers are shown on one or more illustrative drawings.

Further referring to FIG. 10, it can be seen that a row of rear disc gangs 80 are supported by rearwardly extending members of mainframe 20, and of each of the frames of wing assemblies 110, in a similar manner to the way the front disc assemblies are supported beneath the front ends of the mainframe and wing frame members. It should be noted that most of the significant load-bearing support frame members of the exemplary embodiments are fabricated of square tubing of steel material. In FIG. 10, each of the front disc gangs 50 are shown mounted with their outward ends located forward of their inward ends at an angle of approximately nine degrees to frame members extending perpendicular to the forward direction of travel for the implement. Such gang angles, in turn, position the disc blades 53 of the front discs at a soil entry angle of approximately nine degrees to the direction of travel. This is an aggressive angle if the implement is configured for "minimum" or "vertical" tillage, wherein the object is to till the soil with primarily vertically acting components producing minimum to modest horizontal movement of the soil. FIG. 10 likewise shows the rear disc gangs positioned at similar angles to the path of travel, except that the outward ends of the rear disc gangs 80 are positioned rearwardly of the inward ends. Typically, the discs of the front disc gangs are cupped with their concave surfaces facing outwardly on the front gangs. In contrast, the discs of the rear disc gangs 80 are cupped with their concave surfaces facing inwardly, so that whatever horizontal movement of the soil created by the front disc gangs is urged outwardly from the center of the implement, and conversely, any horizontal movement of the soil created by such inwardly cupped discs on the rear disc gangs is urged back toward the center of the implement such that, on balance, the soil particles will be generally positioned in the area where they were originally located.

FIG. 11 illustrates the same basic implement as FIG. 10, wherein, however, the front disc gangs 50 are only slightly angled forwardly from their pivot end in the amount of one or two degrees, and the rear disc gangs are likewise only slightly angled rearwardly from their pivot ends toward their outward ends at about the same angle to the line of travel of one or two degrees. When the implement adjusted as in FIG. 11 is fitted with shallow-cupped discs, the angle of entry of the shallow disc blades may be almost straight forwardly to produce a knifelike action of the blades, with very little horizontal soil disturbance. It will be noted that in FIGS. 10-12, the rear disc gang blades are offset from the front disc gang blades to create a generally uniform transverse spacing between blade paths after passage of all disc gangs. Accordingly, such a shallow angle adjustment as illustrated with both the front and rear disc gangs of FIG. 11 is effective for opening a plurality of generally parallel, narrow slot-like paths in the soil, running in the direction of travel of the implement, which can be effective to permit warm surface air to contact vertical slot side walls of cold soils, to help bring the soil up to a temperature suitable for planting seed earlier than if no such aeration practices were employed. This can be especially effective during so-called "late" springs where planting is delayed because of cold soil temperatures. The disc configuration shown in FIG. 11 is also very effective for cutting tough, fibrous crop residue, such as cornstalks, to help size the residue to a shorter length equal to the distance between parallel disc paths, again without creating substantial horizontal soil movement during tillage.

FIG. 12 shows the same embodiment of the invention illustrated in FIGS. 10 and 11, except that it can be seen that the front discs 53 are arranged with a very shallow angle effective for cutting and sizing crop residue and opening narrow soil trenches for aeration, but the rear discs 83 are set at a more aggressive angle for incorporation of any cut residue into the soil to in part provide a cleaner seed bed in the top levels of the soil.

As the notation at the top of the FIG. 12 indicates, the angles of the front and rear disc gangs could be reversed if it were desired to provide significant horizontal tillage at the front of the implement, and finish cutting and narrow trench creation toward the rear of the implement. FIGS. 10-12 are indicative of the adaptability of the invention to tilling objectives, soil conditions, and residue and temperature conditions, as well as wet, dry, and soft and hard soil conditions. The versatility of the implement front and rear disc gang components has been described by illustration of extreme low angle and aggressive high angle positions. In use, the farm operator will frequently run the disc gangs at various angles between the extremes in order to optimize tillage capabilities. The universal custom field preparation implement 70 of the invention can be configured to enable front and rear disc gang angles of from approximately 0 degrees to more than 13 degrees to accommodate both minimal and more aggressive tillage under a wide variety of soil and moisture conditions.

Figure 20:
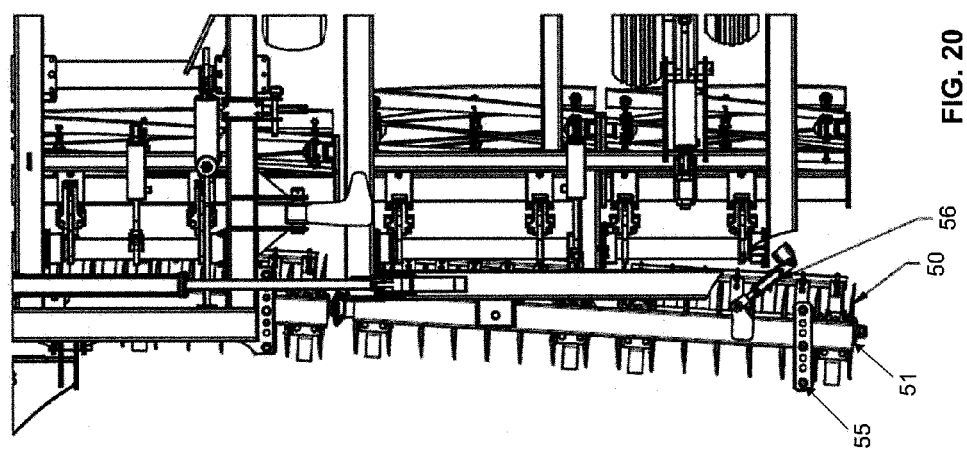
FIG. 20 is another partial top view of the embodiment of FIG. 19, illustrating the adjustable front disc gangs positioned with disc blades at a lesser angle to the direction of travel than shown in FIG. 19.

FIGS. 20 and 21 illustrate an embodiment of the invention wherein front disc gangs 50; and rear disc gangs 80 may be adjusted forward or back to change the working angle of the disc gangs by means of hydraulic operators 56. In such cases, the U-clamps, which capture the distal ends of the disc gang support beams 51, 81, are wider to permit forward and back movement of the beam ends when working angles are changed, and may also include drop pins to be inserted through selected holes in the supporting flanges of the frames to secure the beam ends in fixed adjusted position. Both the front disc gangs and the rear disc gangs can be fitted with hydraulic operators to permit "on the fly" adjustment of the disc angles as the implement is drawn across a field having different soil types, conditions or moisture levels in which case the adjusted positions would be maintained by the hydraulic operators, and drop pins would not interfere with "on the fly" adjustments. As an increasing result of modern agricultural methods and equipment, a large field being tilled may have different portions upon which different crops were grown the previous year, resulting in different residue conditions and tillage requirements. Also, it may be desirable to set the disc gangs at a greater angle when tilling hard soil in portions of a field and at a lesser angle when tilling soft or wet portions of a field. Such changing conditions can be easily adjusted for, from the tractor cab, with hydraulic operators for adjusting the disc gang angles.

FIGS. 19, 21, 22 and 26 illustrate a castoring gauge wheel assembly 120 may be attached to front disc support beams 51 positioned on wing assemblies 110 near the outer end of the wing assembly. The castoring gauge wheel assemblies provide depth control at the front ends of the wing assemblies 110 which are hingedly connected to the mainframe 20, and in the case of FIG. 25, may also be connected (not shown) to the front disc support beam 51 for a second wing assembly 112 hingedly connected to a first wing assembly 110. When the wing assemblies are lowered into working position, they must necessarily "float" with the underlying ground surface. Because of its lateral distance from the mainframe support wheels 30, a wing assembly 110 may encounter ground surface levels at various elevations above and below the surface of the ground beneath the mainframe support wheels. If the land beneath the outer ends of the wing assemblies runs higher in elevation than the land beneath the support wheels 30 of the mainframe 20, the front disc gang 50 of the wing assembly may be pushed deeper into the soil than desired, particularly at its front outer corner. The castoring gauge wheel assemblies 120 project forwardly from the attached front disc support beams 51 in a manner that will anticipate any upslopes beneath the trailing wing assemblies and front disc gangs 50. Accordingly, the gauge wheel assemblies will support the attached front disc gang 50 at the proper level with respect to the higher or rising land profile and enable the discs to maintain their preferred working depth level in the soil being tilled.

Figure 26:
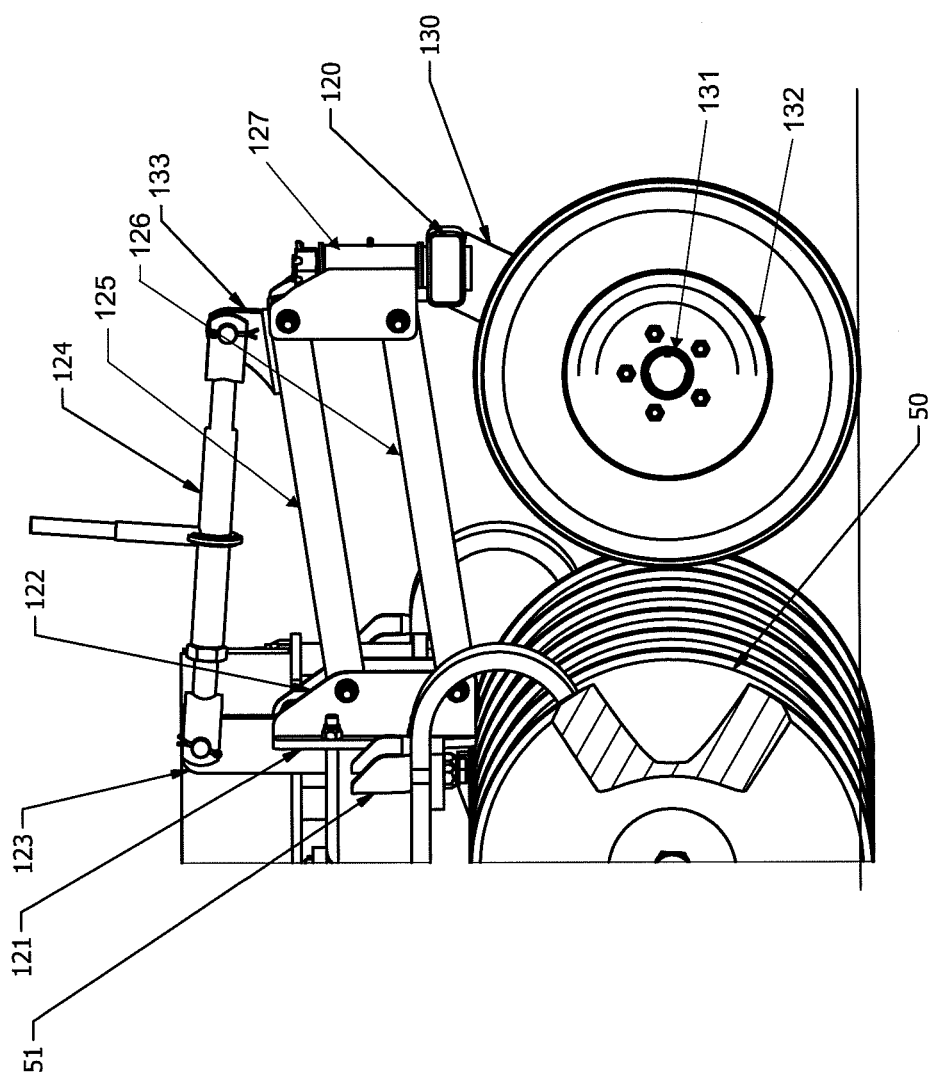
FIG. 26 is a side elevation view of a castoring gauge wheel assembly of the invention is attached to a front disc gang support beam.

The structure of the castoring gauge wheel assemblies 120 is best understood with reference to FIG. 26, wherein a beam engagement plate 121 is shown bolted to the front disc support beam 51. FIG. 21 shows the U-bolts 134 which extend around the support beam 51 from the engagement plate 121. The beam engagement plate 121 has two spaced, parallel, vertically extending attachment flanges 122, and further, has a post 123 extending upwardly from the flange to provide a first connection point for a linear actuator 124 in spaced relation to the attachment flanges 122. The linear actuator 124 may be a turnbuckle actuator as shown, hydraulic actuator, or electrically driven actuator. An upper support arm 125 and a lower support arm 126 have first pivot ends which are positioned between the beam plate flanges 122 in parallel relation by parallel support bolts. The second ends of the upper and lower support arms are similarly positioned an equal distance apart between flanges of a castor assembly 127 and pivotally connected thereto by parallel support bolts. A castor arm 130 has a generally vertical drain pivot shaft (not shown) which is rotatably engaged within the gauge wheel assembly 120 and carries a stub axle 131 at its lower end upon which a gauge wheel 132 is mounted to provide a rotatable castor wheel which is capable of following the path of travel of the wing disc support beam 51 up and down over the variable terrain and through directional changes of the wing as it travels back and forth across the path of tillage and over the headlands as encountered in the field. A castor assembly attachment post 133 extends upwardly from the castor assembly 127 to pivotally engage the second end of the linear actuator 124. It is seen that the equal vertical spacing of each of the ends of the upper and lower support arms 125, 126, establishes a parallelogram linkage wherein the upper end of the castor wheel assembly will remain parallel to the beam engagement plate 121. Accordingly, the castor wheel assembly can be adjusted substantially vertically up and down by respectively shortening or lengthening the linear actuator 124 by rotation of the sleeve of the actuator in a known manner. The lower tire bearing surface can thereby be adjusted to run a desired distance above the level of the bottom of the disc blades of the front disc gang 51 to which the castor assembly is attached, to thereby engage to provide a working gauge for the depth of the front disc gang 50, as the disc gang is propelled across the field.

The universal custom field preparation implement 70 of the invention employs a row of chopping reels 60 between the front disc gangs 50 and the rear disc gangs 80. The chopping reels 60, best shown in FIG. 9, are comprised of a plurality of chopping blades 65 extending helically from one end of the reel to the other in a known manner to present a peripheral surface composed of spaced helical blades which extend into and retract from the underlying soil during operation in a substantially vertical manner to effectively cut slots into the soil extending perpendicular to the line of travel and to the slots created by the disc gangs, and to effectively size any surface plant residue in a linear direction at substantially right angles to the transverse sizing of the residue in a direction parallel to the line of travel effected by the front discs 53 of the implement. When the chopping reels 60 are positioned immediately behind the front disc gangs 50 and ahead of the support wheels 30 and rear disc gangs 80, the front discs 53 can be run at relatively shallow angles for effectively slotting the ground and sizing the crop residue without creating significant horizontal tillage. This front disc action will maintain a relatively firm soil surface which aids in the operation of the chopping reels 60 by providing a resistant soil surface to tough plant residue such as cornstalks to facilitate effective cutting action when the surface lying stalks and other crop residue is subjected to the vertical chopping action of the helical blades 65 of the chopping reels 60. In heavy residue conditions, the rear disc gangs 80 trailing the chopping reels and the support wheels can be set more aggressively, as shown in FIG. 12, to effectively entrain plant residue cut and chopped by the front discs 53 and chopping reelblades 65 into the soil to create conditions for a good seed bed, and also to loosen up the soil packed by the support wheels 30 of the implement.

Figure 2:
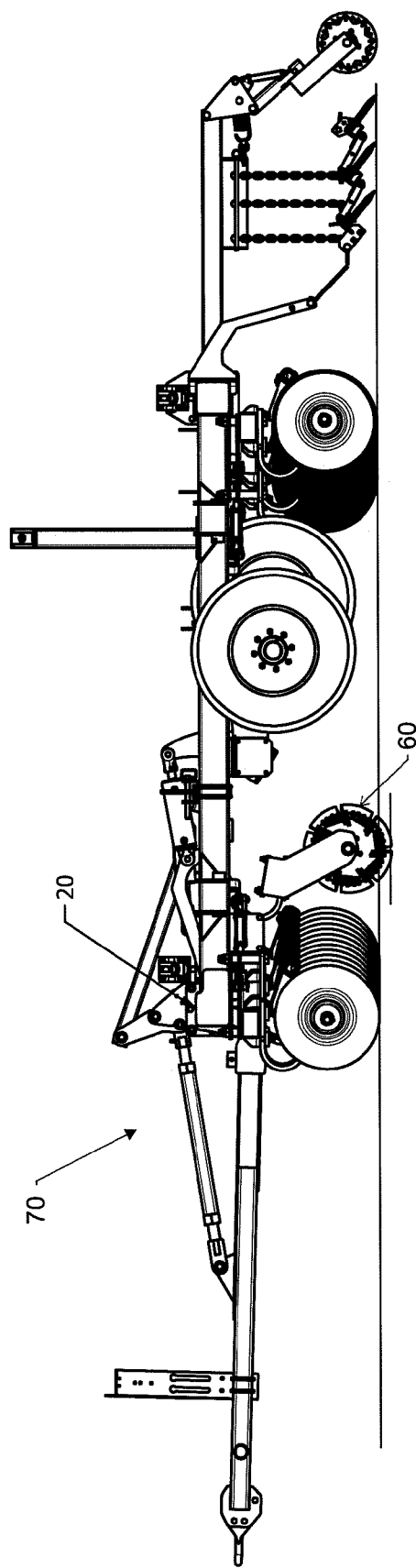
FIG. 2 is a side view of the exemplary embodiment of FIG. 1, wherein the chopping reel component is positioned for deeper engagement in the soil that the other working components.

The chopping reels 60 are shown in FIG. 9 to be mounted on C-springs 62 coupled to rock shafts 61 by a structural member 64 extending from the rock shaft 61. A hydraulic actuator 63 is pivotally connected between a mainframe member and the chopping wheel assembly 60 to cause the chopping reel assembly 60 to pivot about the axis of the rock shaft between an upper traveling position (FIG. 8) and a lower working position (FIG. 2). Accordingly, the chopping reels can be separately adjusted to be engaged with the ground at an equal depth with the other implement components (FIG. 1), engaged at a deeper depth than other components (FIG. 2), disengaged from the ground while any or all other components are engaged with the ground (FIG. 3), and adjusted to any desired working depth when the mainframe and any connected frames are configured such that the front discs gangs are engaged with the soil while the rear disc gangs are not in contact with the soil, or the rear disc gangs are engaged deeper than the front disc gangs, which may or may not be engaged at the same time as the rear disc gangs.

Figure 27:
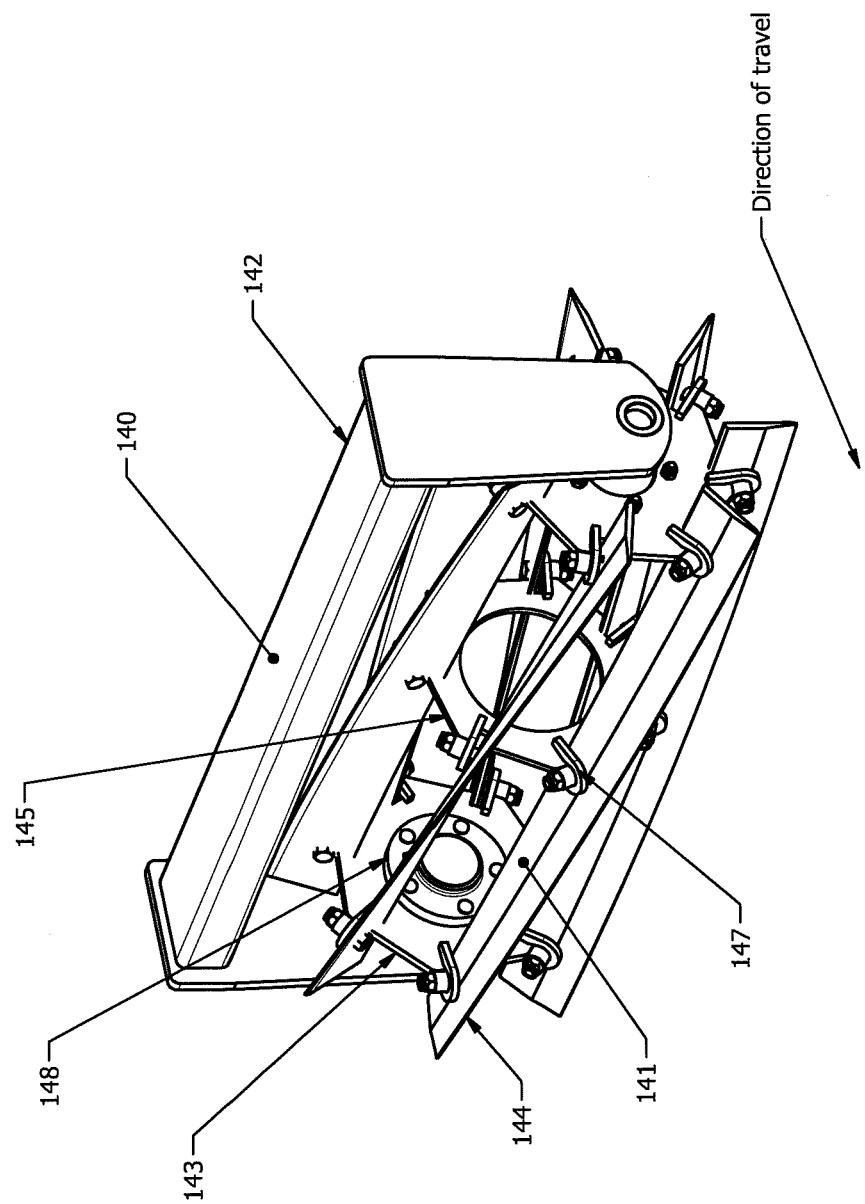
FIG. 27 is a perspective view of an exemplary embodiment of an improved open spiral chopper reel assembly with field serviceable self-cleaning hubs which is disclosed in the present application.
Figure 28:
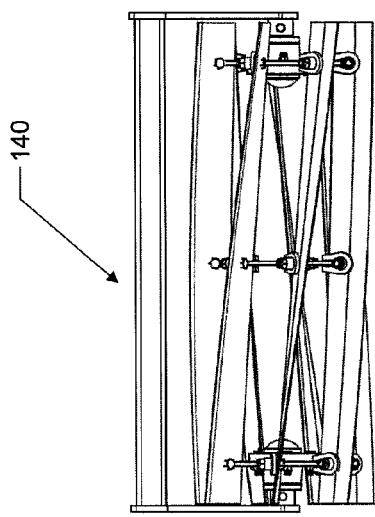
FIG. 28 is a front view of the improved open spiral chopper reel of FIG. 27.

FIGS. 27-33 illustrate exemplary embodiments of an improved open spiral chopping reel assembly 140 with field serviceable self-cleaning hubs which may be advantageously employed as chopping reels 60. FIG. 27 is a perspective view of a "48-inch full assembly" chopping reel assembly 140 of the improved design which is illustrated in the drawings of this application. It can be seen from FIG. 27 that the chopping reel consists of a plurality of sharpened spiral or helical blades which extend from and between opposed end plates.

The improved open spiral chopping reel assembly 140 includes an open spiral chopping reel 141 rotatably mounted within a chopping reel frame 142. The chopping reel 141 can be seen to consist of a pair of opposed chopping reel end plates 143, to which a plurality of helical blades 144 are attached and extend between and beyond the end plates 143 in a spiral array having an effective circumference defined by the outwardly extending cutting edges of the blades 144. One or more annular reinforcement rings 145 are positioned between the reel end plates 143 and are similarly attached at their periphery to the blades 144 to provide stability and reinforcement for the blades. The lengths of the reels as defined by the blades may be of any desired length, typically between approximately 48 inches and 95 inches. As a practical matter, the length of the reels will be somewhat dependent upon the width of the frame sections of the tillage implement beneath which they are intended to be used. The annular reinforcement rings 145 are typically spaced approximately 16 to 24 inches apart. The illustrated reels are shown with seven equally spaced blades 144 attached around the periphery of the end plates 143 and annular reinforcement rings 145 to produce an effective reel diameter of approximately 20 inches. Less or more blades may be employed with different effective diameters, depending upon the size of the discs or other components of the implement. It can be seen that the open spiral chopping reel assembly does not include an axle extending between the end plates, but rather has an open structure with the annular rings 145 having wide diameter open centers to allow any mud or crop residue lifted by the blades to pass as easily through the rings as through the open center areas of the reels 141 between the rings. The blades 144 can be seen from the drawings to be connected to the end plates and annular rings by conventional bolts which extend through the blades and the attachment plates 147 which are typically welded to the plates and rings in the positions shown, and secured by nuts as shown. It can also be seen from FIG. 30 that the end plates 143 and annular reinforcement rings 145 have blade slots 146 which receive the blunt edges of the blades 144 which fit snugly between the edges of the slots 146 and the attachment plates 147.

Figure 29:
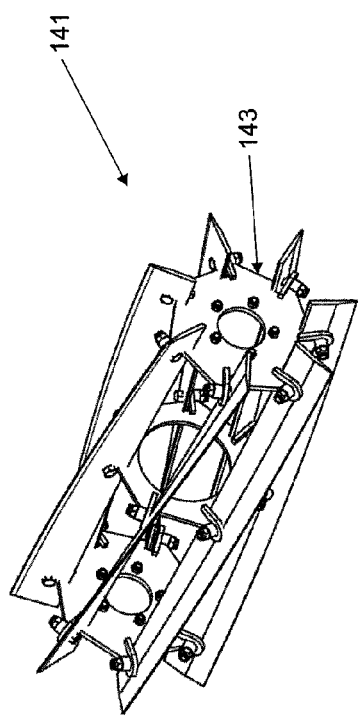
FIG. 29 is a perspective view of the improved open spiral chopper reel of FIG. 27, with the chopper reel frame and hub assemblies removed.
Figure 30:
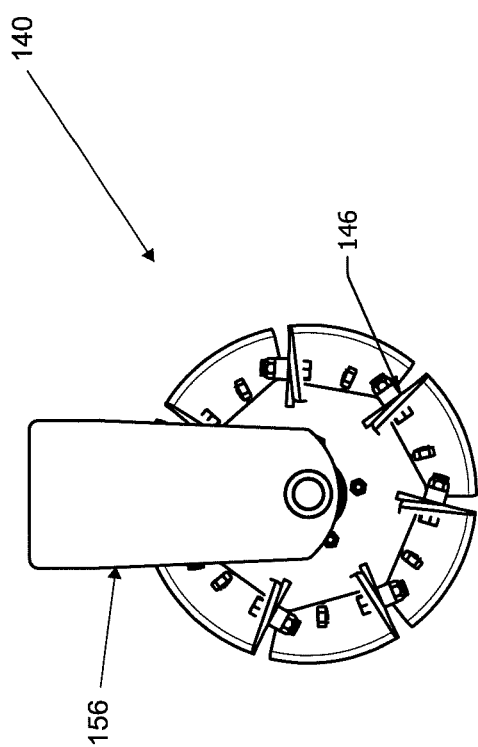
FIG. 30 is a schematic end view of the chopper reel end plate and frame end plate without connecting hardware, and without chopper blades attached to the flanges.

It will be seen from FIG. 29 that the reel end plates 143 are substantially solid except for a center pilot hole to receive the body of the hub 148 and a plurality of holes arrayed around the pilot hole for receiving attachment bolts 158 which extend through the hub attachment flange and the bolt holes in the end plate to secure the hub to the end plates 143. As seen from FIGS. 27, 28, and 31, the attachment flange portion of the hub 148 is bolted to the inside surface of the end plate 143, with the body of the hub 148 containing seals and bearings extending through the pilot hole for fixed engagement of the outer end 149b of the spindle 149 within a receiving collar 158 mounted on a plate bolted to the inside surface of the frame end plate 155. The frame end plates 155 are spaced by and extend perpendicularly down from the frame support bar 156. A spindle attachment bolt 157 extends through the collar 158 and a bore hole through the end of the spindle to lock the spindle in place with respect to the frame 142.

Figure 32:
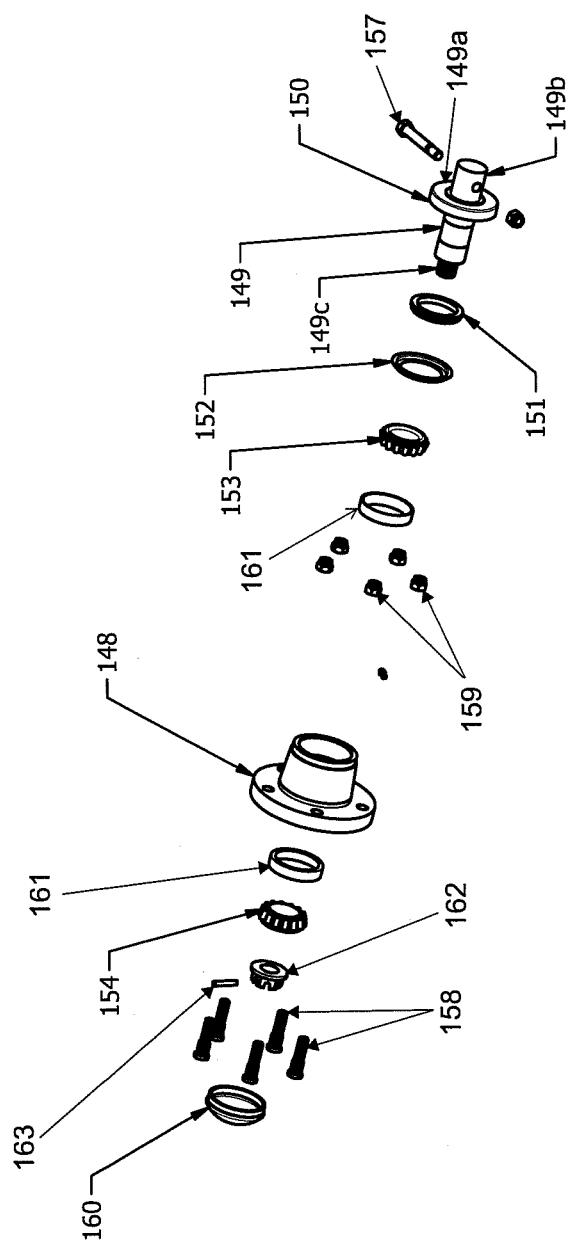
FIG. 32 is an exploded view of the field serviceable self-cleaning hub assembly for the improved spiral chopper reel of FIG. 27.

FIG. 32 is an explosion view of the hub assembly including, from right to left, the spindle 149 with annular ring 149a around the spindle body near the outer end of the spindle 149. A metal seal ring 150 is pressed onto the annular ring 149a of the spindle in a pressed type fit. Elastomeric ring 151 fits around the inside bore of the metal seal ring in lubricant type relation. A flanged spacer ring 152 fits around the center circular flange of the metal seal ring 150 to retain the elastomeric seal and provide a fluid-tight seal between the metal seal ring 150 and the flange spacer ring 152. The inner bearing 153 is positioned on the spindle body against the inner end of the metal seal ring 150, and also is engaged in an inner bearing race 161 of the hub 148. The outer ring of the metal seal ring 150 fits tightly around the recessed outer end of the hub 148 to capture the elastomeric seal 151 and flange spacer ring 152 between the metal seal ring and the end of the hub. At the other inner end of the hub 148, a tapered rolling bearing 154 is fitted over the end of the main diameter portion of the spindle 149 and within a bearing race 161 within the hub. The smaller diameter inner end 149c of the spindle is threaded and includes a hole extending through the threaded end. A retaining nut is then threaded onto and tightened to axially tighten the assembly together on the spindle. A bolt or cotter pin 163 can be extended through the spindle hole to retain the assembly in place. Hub cap 160 is then friction fitted into the margin between the nut and the hub body to close and seal the inner end of the hub assembly from dirt, moisture and debris.

Figure 31:
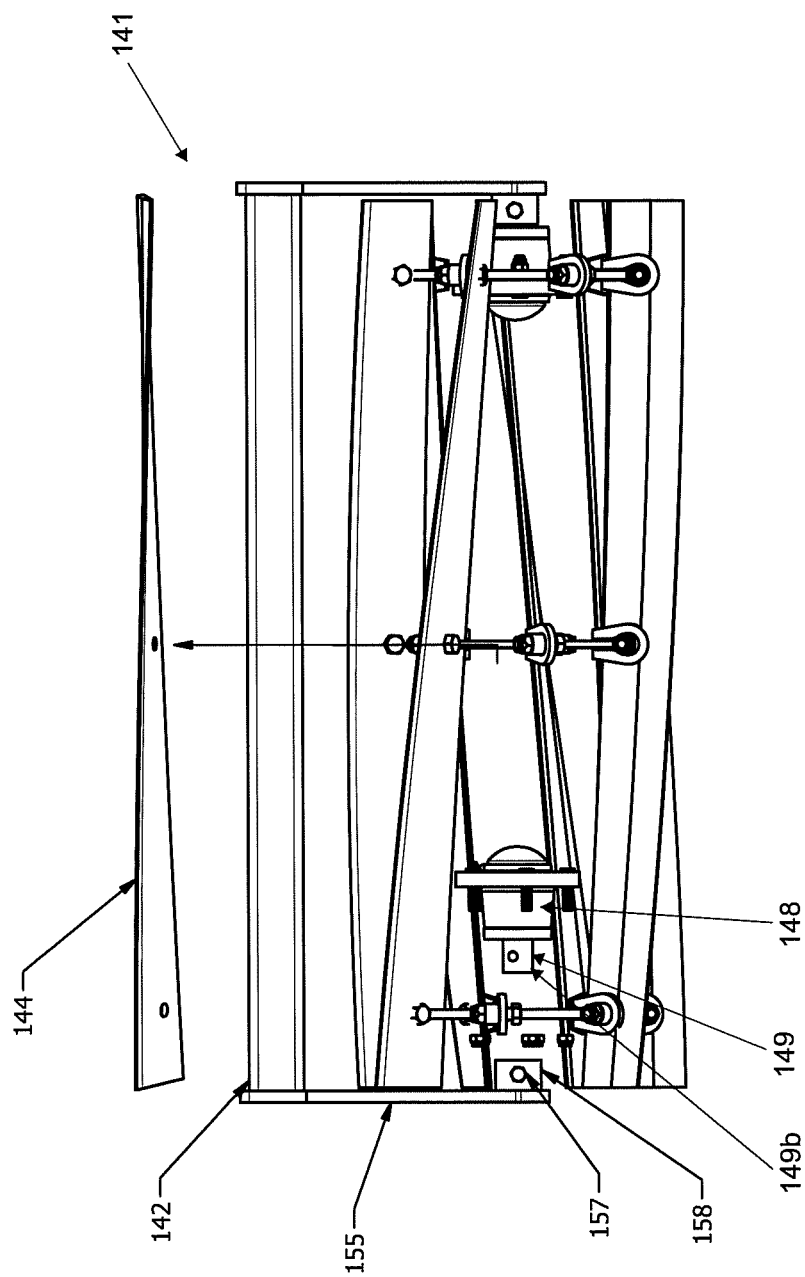
FIG. 31 is a front view of the improved open spiral chopper reel of FIG. 27, with a single blade removed and a hub assembly removed from the left end plate to illustrate the ease of blade and/or hub replacement in the field.

FIG. 31 illustrates the manner in which a blade 144 of the chopping reel 141 can be removed from the reel by removing the bolts which hold it in place within the chopping reel blade slots 146 to permit field access to the hub for servicing or replacement. Damaged chopping reel blades can also be similarly removed and replaced with new blades without the need to replace the whole reel. With one blade removed, the inner end of the hub is completely accessible and can be removed from the reel by removing the bolts which hold the flange of the hub against the end plate of the reel and removing the spindle attachment bolt 157 to release the spindle and the hub for removal from the interior of the reel for service or replacement. A new hub assembly 148 can be easily reinserted and attached in the opposite manner as described for removal. It can be seen that the inner ends of the hub comprising the hub flanges and hub caps provide no surfaces for easy retention of mud, manure, crop residue, or any other foreign material which may be forced upwardly by the engagement and disengagement of the blades of the rotating reel during its use. It can further be seen that the interior of the reel is entirely open to allow easy pass-through of debris.

It can be seen that the frame end plate 155 and the frame upper support bar 142 of the improved open spiral chopping reel assemblies 140 of FIGS. 27-32 can be easily modified to the shapes of the rearwardly angled frame and end plate structures of the chopping reel assemblies 60 as shown in FIGS. 1-9, to facilitate use of the improved open spiral chopping reels 141 as the chopping reels for the universal custom field preparation implement 70 disclosed herein.

Figure 5:
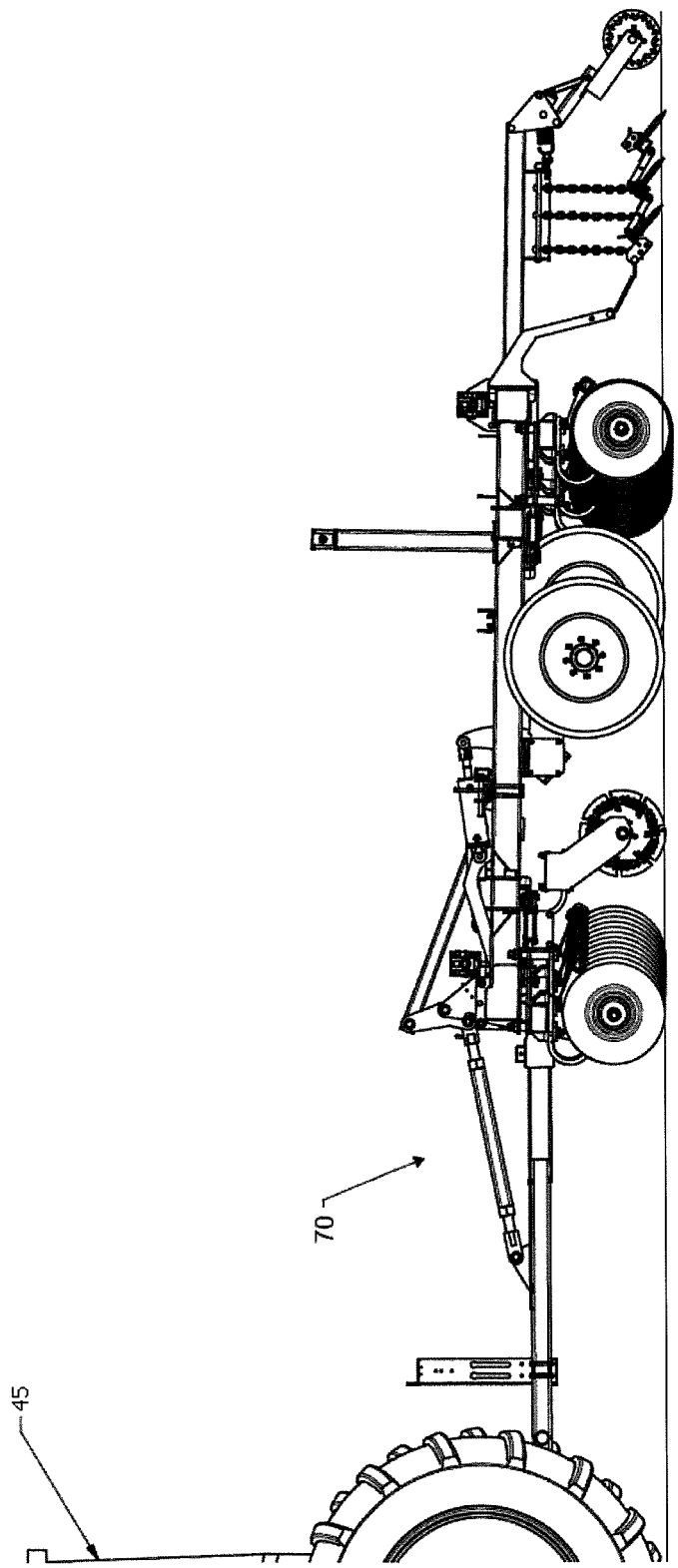
FIG. 5 is a side view of the exemplary embodiment of FIG. 1, wherein the tongue angle is adjusted for deeper rear disc blade engagement, and all of the other working components are adjusted to engage the ground equally.
Figure 6:
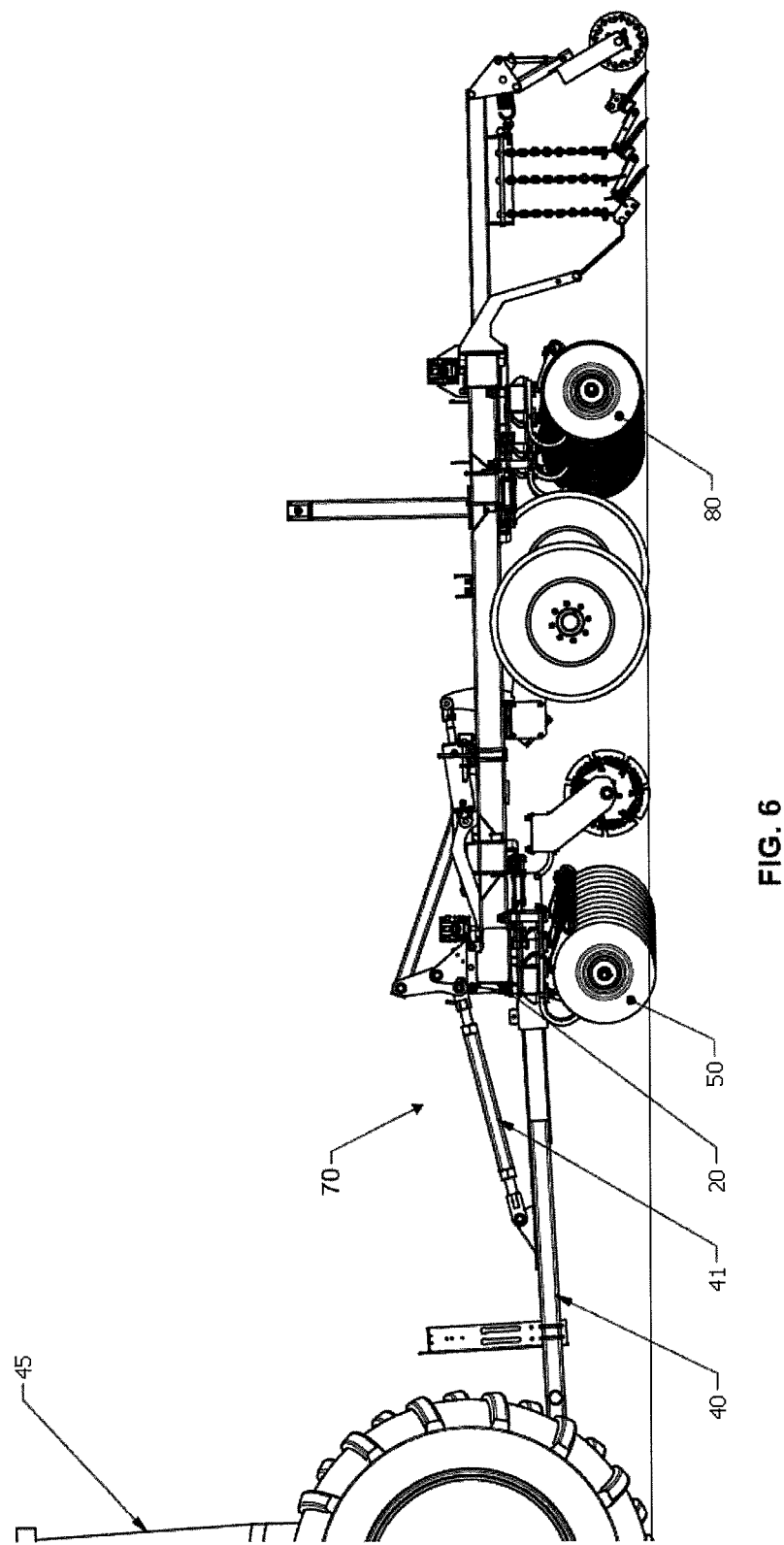
FIG. 6 is a side view of the exemplary embodiment of FIG. 1, wherein the tongue angle is adjusted so that the rear disc blades are not in contact with the soil and the rest of the components are adjusted for ground engagement.
Figure 7:
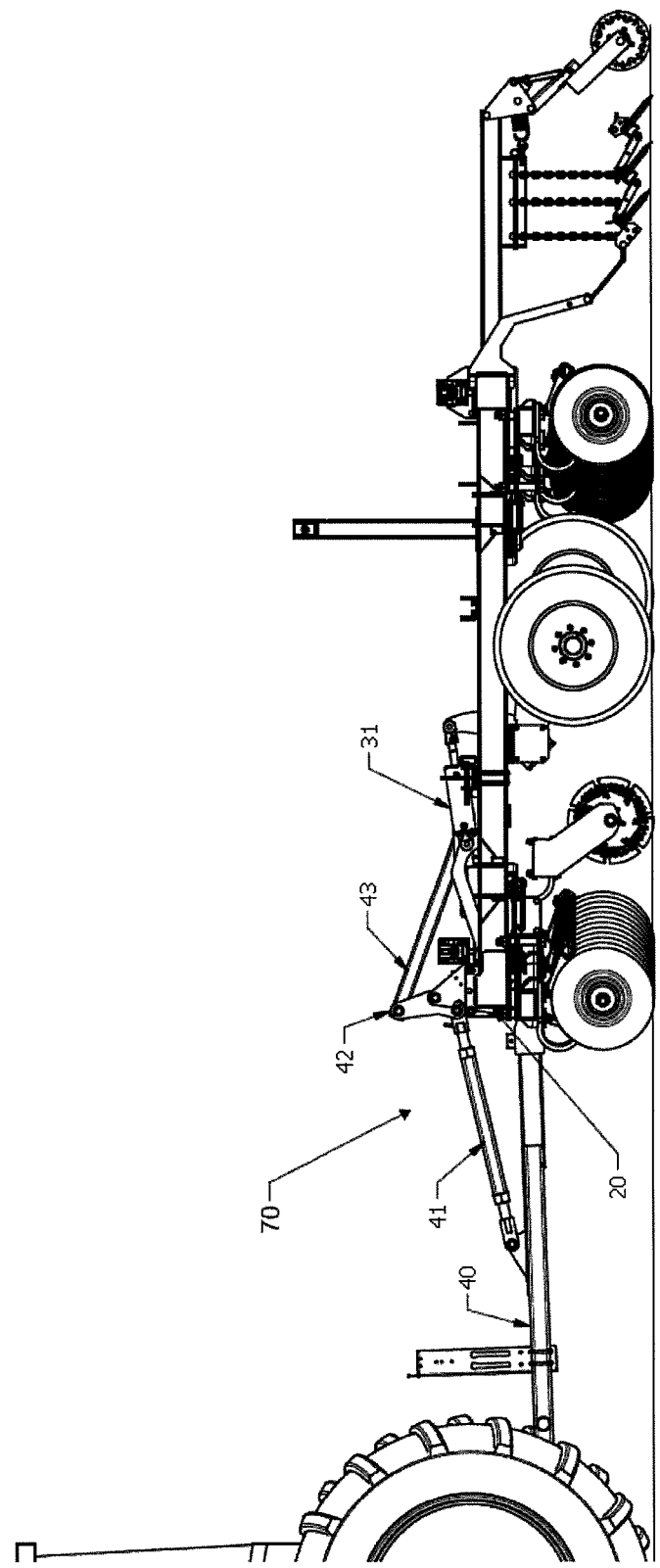
FIG. 7 is a side view of the exemplary embodiment of FIG. 1, wherein the implement is in working position with the transport wheels lowered for depth control and stability.

It should be noted that FIGS. 1-6 are shown for illustrative purposes with the support wheels 30 raised above ground level. Such configurations can be selected, particularly where the ground is hard and it is desired to place the maximum weight of the implement on the tillage components. However, in most operations, the transport wheels will be lowered to a ground-engaging level for depth control and improved stability of the implement during operations of the implement in any configuration, as shown in FIG. 7. Of course, as shown in FIG. 8, the support wheel assemblies 30 can be lowered by the hydraulic wheels actuator 31 to raise the entire implement to a headland or highway travel position. A conventional mechanical transport lock (not shown) can be engaged when the implement is in transport position to prevent lowering of the implement while in the transport mode, even if the hydraulic system should fail, or the controls be accidently moved to a lowering position by the operator during highway travel.

FIGS. 13-16 schematically illustrate the structure, function, and operation of each of the lift arm three-bar subassemblies 90, fixedly extending rearwardly from each of their points of attachment to the rear of the mainframe 20 or the frame members of wing assemblies 110. FIGS. 10-12 and 18 also show top views of the lift-arm three bar subassemblies 90 as attached to the rear ends of the mainframe 20 and frames of the wing assemblies 110. Alternatively, the lift-arm three bar subassemblies 90 may each be pivotally attached to the rear ends of the mainframe 20 and the frames of the wing assemblies 110, 112, and hydraulic actuators (not shown) may be pivotally connected to and positioned between a horizontal beam portion 97 of the lift-arm three bar subassembly 90 and an upward projection (not shown) from the rear end portions of the mainframe 20 and the frames of the wing assemblies 110, 112, in a known mechanical manner to permit the lift-arm three bar subassemblies 90 to be raised and lowered from the tractor seat by the tractor operator for on-the-fly disengagement and engagement of the harrow sections 91 with the soil regardless of the configuration of the mainframe 20 and the positions of the other engaged or disengaged soil working components.

Figure 15:
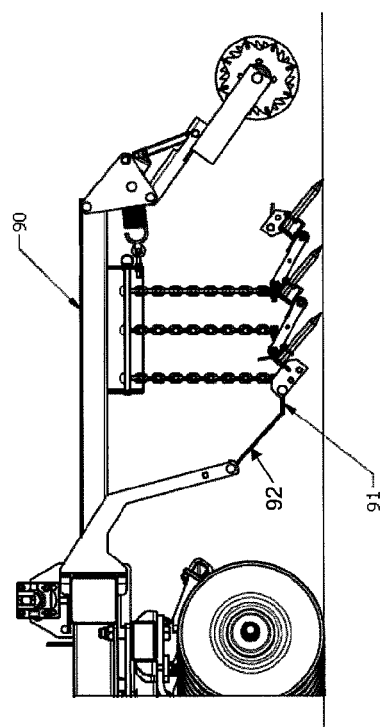
FIG. 15 is a side view of the rear frame subassembly of FIG. 13, wherein the three-bar harrow is schematically illustrated in an engaged position and the rolling basket is illustrated in a disengaged position.
Figure 16:
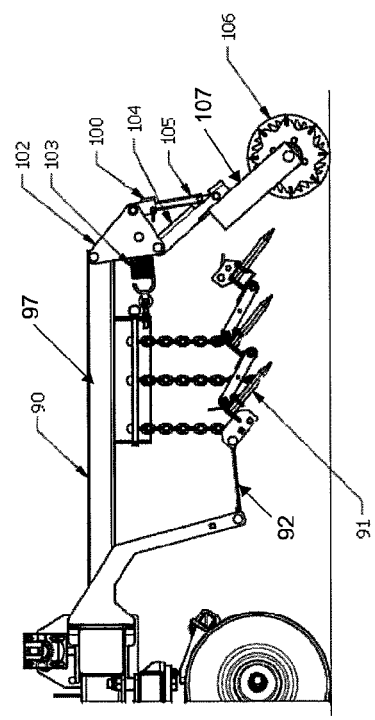
FIG. 16 is a more inclusive side view of the rear subassembly of FIG. 13, showing its attachment to the rear disc frame, wherein the harrow sections are schematically illustrated in a disengaged position, and the rolling basket is illustrated in an engaged position.

FIGS. 13-17 are larger scale views of the lift arm three-bar sub-assemblies 90. FIG. 13 schematically shows a three-bar harrow section 91 suspended at one side from a horizontal beam of a subassembly 90 by a plurality of schematically illustrated harrow support chains 93, whereby the harrow support chains 93 are suspended from a harrow support plate 95 attached to the underside of the horizontal beam portion 97 of sub assembly 90. The harrow section 91 is connected to the support plates 95 and adjusted such that the suspended lengths of the support chains 93 between the support plates 95 and the harrow section 91 are sufficient for the suspended three-bar harrow section to engage the ground in working position when subassembly 90 attached to mainframe 20 or the frames of the wing assemblies 110. It is further shown in FIGS. 13 and 18 that each three-bar harrow section 91 is supported by a three-bar subassembly 90 having two spaced horizontal beams 97, such that each side of a three-bar harrow section is supported by a set of harrow support chains 93. Each schematically shown front harrow support chain 92 is connected to a drop bar 98 extending downwardly from a horizontal beam 97, and in use the rear end of the front support chain 92 is attached to the front end of the three-bar harrow section 91 as best shown in FIGS. 14 and 16. When so connected to the harrow section shown in a lower ground engaging position in FIG. 13, a front support chain 92 will be pulled down at an angle by the harrow section in a known manner, and the support chains 92, 93 may be attached to the three-bar harrow section 91 such that the spikes 94 of the harrow section may be oriented in a selected vertical orientation as shown in FIG. 13. The more vertical the spikes 94 of the harrow the more aggressively the harrow will penetrate the soil. The less vertical the spikes 94 the smoother the surface will be after tillage. The plural drop chains 93 are connected at their lower ends to support brackets extending from the upper portions of the spike teeth 94 of the harrow. Their upper ends are engaged in slots (not shown) extending downwards from partially shown holes through the support plate 95, and retained in such slots by an insertable, horizontal pin 96 to retain the selected engaged links of each chain to provide the desired working depth for the spiked teeth of the harrow section.

A pivoting rolling basket support arm assembly 100 supports a rolling basket 101 at a selected level below the horizontal beam of the assembly frame 90. Referring to FIG. 16, the support arm assembly 100 has an upper triangular plate 102 which is pivotally attached to the horizontal beam 97 of subassembly 90 and is urged forwardly by extension spring 103 toward its normal operating position. A lift arm 104 is pivotally attached to the lower corner of the triangular plate 102, and has a lower arm section 107 which engages a conventional rolling basket 106 in rotating relation. A turnbuckle link 105 is pinned at its top end to the rear corner of the triangular plate 102 and at its lower end to the rear side of the lift arm lower section 107. The turnbuckle link 105 may be shortened or lengthened by turning a threadedly engaged section thereof in a known manner to cause the lift arm 104 to pivot about its upper connection to the triangular plate 102 to thereby regulate the vertical distance of the basket to the horizontal beam of subassembly 90. This adjustment will in turn cause the downward pressure of the rolling basket on the underlying tilled surface to increase when the turn buckle is lengthened or decrease if the turn buckle is shortened to produce the amount of force deemed desirable to break up any soil clogs that have passed through the harrow and allow the conventional rods or bars of the rolling basket to firm up the finished soil surface as desired. Accordingly, in FIG. 13, the pivotable lift arm 104 is fixed in a lowered position in which the rolling basket 106 is being biased against the underlying soil surface by the turnbuckle 105 and extension spring 103, acting through the lift arm linkage. In FIG. 14, both the harrow sections 91 and the rolling basket have been raised to a disengaged position by schematically shortening the upper harrow support chains 92 as previously described, and shortening turn buckle link 105. In FIG. 15, the upper harrow support chains 93 have been lengthened to engage the spikes of the harrow, while the rolling basket has been disengaged by shortening the turn buckle link 105. Conversely, in FIG. 16, the harrow sections have been disengaged by schematically shortening the harrow support chains 93, and lengthening the turn buckle link 105 to engage the rolling basket with the ground surface. It is understood that in use, the front support chains 92 would remain connected to the front portion of the harrow sections 91, as shown in FIGS. 14 and 16, throughout all selected working and raised conditions. As previously mentioned, if hydraulic operators (not shown) are provided for the raising and lowering of pivotally attached lift-arm three bar subassemblies 90, or any equivalent support mechanism for the harrow sections 91 and the pivoting rolling basket support arm assemblies 100, the pivoting rolling basket support arm assemblies 100 can be lowered and raised with the lift-arm three bar subassemblies to engage or disengage the harrow sections 91 and the rolling baskets 10, or either of them, with the soil, on-the-fly, by the tractor operator to most efficiently apply only the necessary soil working components for the soil conditions or tillage purposes as the soil conditions or residual cover conditions vary across any field.

Figure 4:
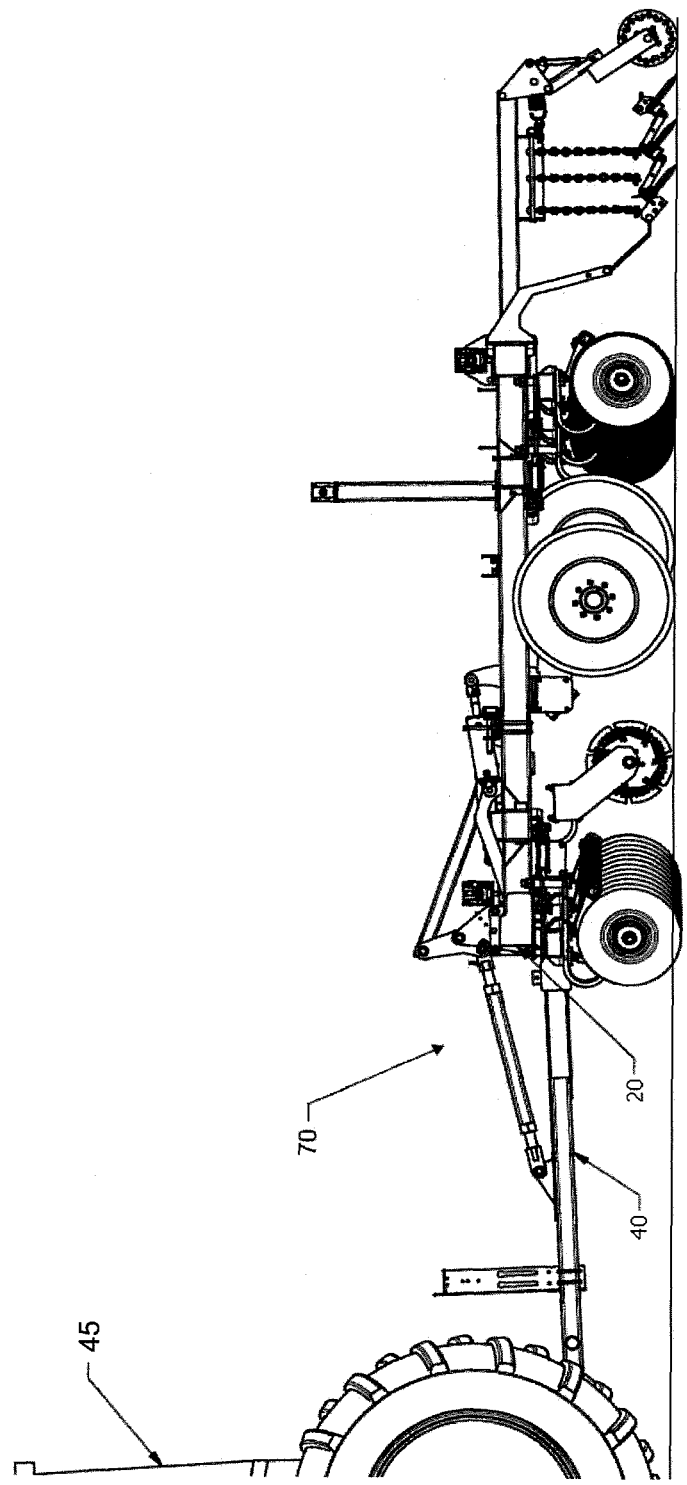
FIG. 4 is a side view of the exemplary embodiment of FIG. 1, wherein the tongue angle is adjusted on the mainframe of the implement for deeper front disc blade engagement, and all of the other working components are adjusted to engage the ground equally.

One of the adjustments possible for the individual tilling components of the universal custom field preparation implement described herein, is the working angle of the mainframe 20 which can be adjusted in coordination with height adjustments of the support wheels to provide numerous working combinations of tillage components. The working angle of the mainframe 20 can be adjusted by use of machine pivoting tongue actuator 41, which extends rearwardly from a front pivotal connection to a pin mounted above the top surface of the tongue 40 at a point on the tongue 40 several feet forward of the pinned connection point of the rear end of the tongue 40 toward the front end of the mainframe 20. The actuator 41 is pinned to an intermediary pivotal link 42, which link 42 in turn is pivotally attached at its pivot point to an upwardly extending portion 45 of the front end of the mainframe 20, as best shown in FIG. 8. The intermediate link 42 extends upwardly from its pivot point to an upper end 42 which is pivotally attached to a rear link 43. The rear link 43 extends rearwardly to a point of pinned pivotal attachment to the rock shaft 33, see FIG. 10, about which the support wheel assemblies rotate when the support wheels are raised and lowered. Referring to FIG. 4, shortening of the tongue actuator 41 causes the tongue 40 to pivot upward with respect to the frame. When the support wheels are engaged with the ground surface and the front end of the tongue is hitched to the tractor drawbar for use of the implement, such shortening of the tongue actuator causes the described linkage to pivot the mainframe 20 about the wheel axles to push the front disc gangs 50 down or into engagement with the ground, depending upon how much the tongue is shortened. FIG. 4 schematically shows the rear discs in shallow engagement, and FIG. 6 shows the rear disc raised to a level of no ground engagement. Conversely, lengthening of the tongue actuator 41 enables the described linkage to pivot the mainframe 20 about the wheel axles to raise the front disc gangs 50 and lower the rear disc gangs 80, to reach the positions shown in FIG. 5. If the tongue actuator 41 is lengthened or shortened when the tongue is disconnected from a tractor, the front end of the tongue will be lowered or raised respectively.

Because the mainframe is relatively short from front to rear, whereby the front disc gangs are separated from the rear disc gangs by only enough to allow full non-interfering raising and lowering of the chopping reels 60 and the support wheels 30, lengthening or shortening of the tongue actuator can effectively change the operating characteristics and capabilities of the implement from one in which the front disc gangs run lower and less aggressively than the rear disc gangs, as shown in FIG. 4, or the rear disc gangs can run lower and more aggressively than the front disc gangs, as shown in FIG. 5. In addition, when the frame is tilted as shown in FIG. 6, implement can be operated with the front disc gangs of the implement engaged in the soil and the rear disc gangs disengaged. Likewise, the linkage and height of the support wheels can be adjusted so that when the implement is in the configuration shown in FIG. 5, the rear disc gangs can be engaged with the soil and the front disc gangs can be disengaged. Because the intermediate chopping reel assemblies are independently adjusted by the hydraulic actuators 63 to rotate around the axis of the rock shafts 61, the chopping reels 60 reels can be engaged or disengaged as desired or required through any range of tilt adjustment of the mainframe, the support wheel assemblies 30 and tillage or non-tillage engagement of the front and rear disc gangs.

Accordingly, it can be seen that the universal custom field preparation implement disclosed herein is a uniquely flexible tool for providing custom field preparation capabilities as appropriate for the most desirable tillage of the land for a variety of purposes under a wide variety of soil, crop residue, and moisture level conditions. Unlike prior multiple component tillage implements, each of the components of the present invention can be run separately or in combination with any one or more of the other tillage components of the implement. Thus, the front disc gangs 50 may be operated at any disc angle within a range of one degree to ten degrees or more as optionally configured alone, or in combination with the chopper reels with both the front discs and the chopper reels each running at selected optimum depths, depending on the task and the conditions. The front disc gangs can be run in combination with the rear disc gangs, with both disc gangs run at selected disc angles and independently selected depths from shallow to deep, and with or without engaged intermediate or engaged following chopper reels, three-bar harrows, and/or rolling baskets, each of which additional components can be run at any selected depth or disengaged, regardless of the engagement or disengagement of any one or more of the other tillage components. The chopping reels can be run in the ground with the front end and rear disc gangs out of the ground, followed by the harrows, to become an effective chopper/harrow implement; the implement can be run with both disc gangs engaged and the chopping disengaged, as might be appropriate for wet conditions or extremely rocky conditions, or to leave more residue in highly erodible soils. Regardless of the manner of employing the discs and the front and rear disc gangs and chopping reels, the harrow and/or basket can be employed to provide a firm level seed bed as conditions require, or either component disengaged.

Figure 17:
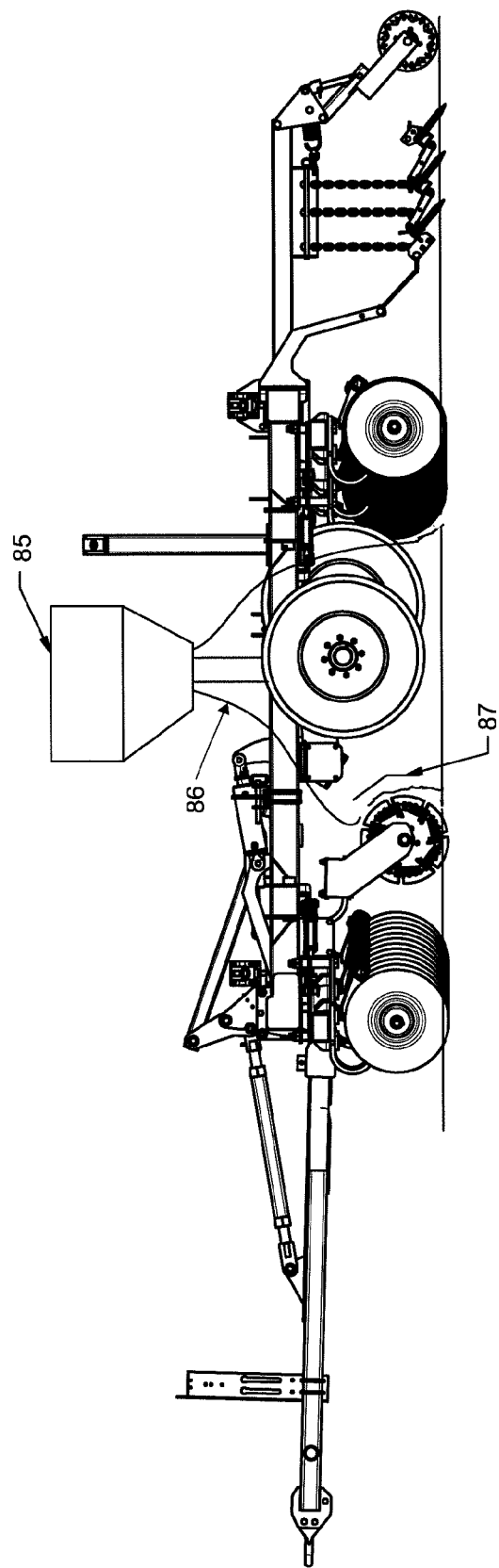
FIG. 17 is a side view of an exemplary embodiment of the invention shown in FIGS. 1-8, wherein one or more seed and/or fertilizer hoppers are mounted above the mainframe by any suitable and conventional support structure extending upwardly from the mainframe, with seed and/or distribution tubes schematically shown for distributing seed and/or granular materials from the hopper to distributive locations between the chopping reels and rear disc gangs for incorporation into the soil.
Figure 18:
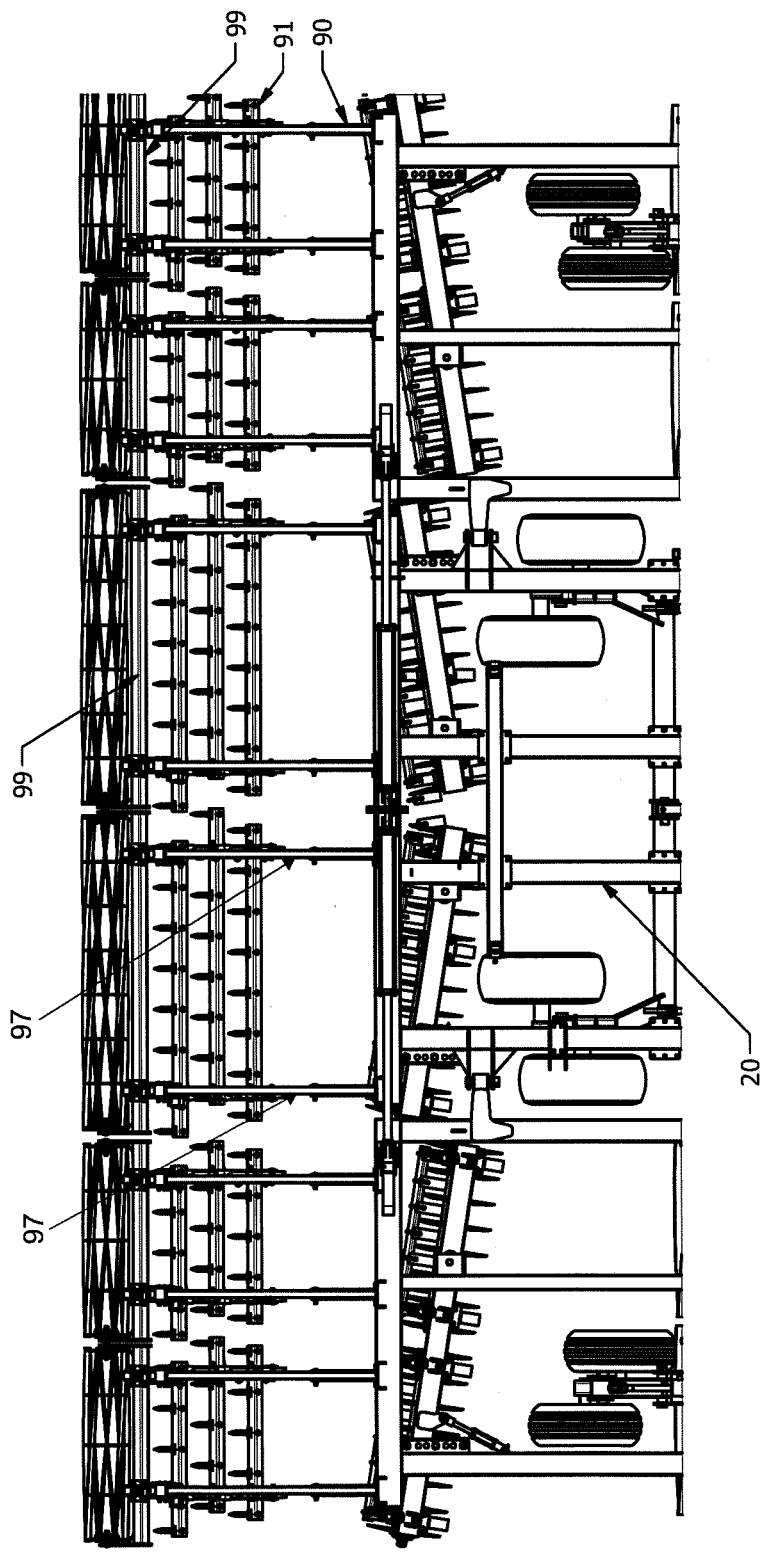
FIG. 18 is partial top view of the embodiment of FIG. 10, illustrating some of the structure of the rear sub-assemblies for supporting the three-bar harrow sections and the lift-arm assemblies for the rear rolling basket components.
Figure 19:
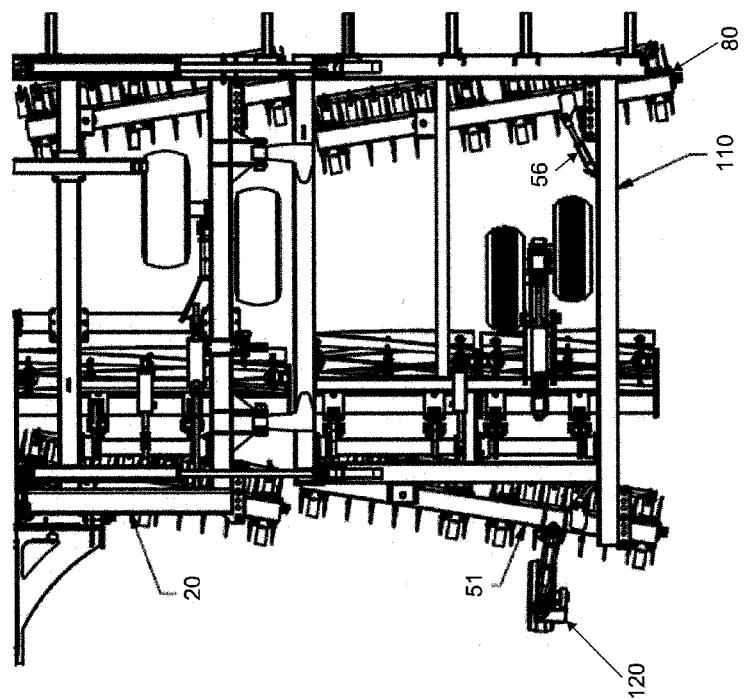
FIG. 19 is a partial top view of an exemplary embodiment of the invention, further illustrating the adjustable angle front disc gangs of a side wing assembly of the exemplary illustrated implement, and also illustrating a castoring gauge wheel mounted to a front disc gang of a wing assembly.

Air seeder and/or granular seeder hoppers 85, and schematically shown seed and fertilizer distribution lines 86, incorporation shrouds 87 of the types shown and described with reference to FIG. 17 can be employed to entrain seed, fertilizers, herbicides, pesticides, and lime in the soil for desired soil conditioning and broadcast seeding applications in combination with any one or more of the described tillage implements. The desired tillage and soil entrainment of crop residue and any of the seed or soil conditioning materials described above can be obtained using only those tillage components which are necessary under the conditions to produce the desired result, thereby requiring less fuel and a less powerful tractor than would be necessary to propel all working components of the implement through the soil.

The universal custom field preparation implement can be fitted with shallow cupped disc blades in the front disc gangs and more deeply cupped discs in the rear disc gangs, or any other desired combination of discs as desired or required for prevailing soil conditions. The disclosed implement may be typically operated at speeds from six to ten miles per hour, or slower as conditions require.

The universal custom field preparation implement provides an implement of maximum flexibility to meet and achieve optimal custom tillage results under all workable conditions, soil types, and seasonal needs. The implement can be readily adjusted and adapted for optimal minimum tillage, single-pass tillage, vertical tillage, and aggressive horizontal tillage, depending upon the preferences and needs of the farm operator.

While this invention has been described in conjunction with the exemplary embodiments outlined above, various alternatives, modifications, variations, improvements and/or substantial equivalents, whether known or that are or may be presently foreseen, may become apparent to those having at least ordinary skill in the art. Accordingly, the exemplary embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

What is claimed is:

1. A universal custom agricultural field preparation implement comprising:
    a mainframe having a plurality of connected transverse and longitudinal tubular frame members;
    a plurality of support wheel assemblies coupled to the mainframe, each support wheel assembly having at least one wheel for supporting the mainframe and having at least one hydraulic wheel actuator for lowering the at least one wheel to selectively vertically position the frame for soil tillage operations and for raising the frame for transport over the soil or highway;
    a framed tongue assembly connected to the front end of the mainframe in pivotable relation, the tongue assembly having a front end attachable to a tractor drawbar to power and control movement of the implement, and having a frame pivoting actuator pivotally linking a pin mounted on the tongue a distance forward of the pivotal connection of the tongue to the mainframe with a first distal end of an intermediary pivotal link which is pivotally linked at an intermediate portion of the intermediary link to an upwardly extending portion of the front end of the mainframe, the intermediary link itself being further pivotally linked at a second distal end to a rear link which extends rearwardly from the front end of the mainframe or operative pivotal connection to the wheel assembly, the first and second distal ends being physically separated from the intermediate portion of the intermediate link and from each other,
    a plurality of soil working components coupled to the frame, said components further comprising:
    a plurality of front disc gangs flexibly connected to the front portion of the mainframe such that the disc gangs extend generally beneath a front frame portion and when in contact with the soil are the first working component of the implement to engage the soil as the implement travels forwardly across the soil, the front disc gangs being adjustable between positions generally perpendicular to the line of travel of the implement and positions forwardly angled from the perpendicular, each disc gang comprising a plurality of spaced, shallowly outwardly concaved discs rotating about the axles of the disc gangs to directionally engage the soil from generally parallel with to an acute angle to the line of travel;
    a plurality of chopping reel assemblies connected to the mainframe and aligned closely behind the front disc gangs and immediately forward of the support wheel assemblies, each chopping reel assembly having a rotatable chopping reel having a plurality of shallow helical blades which extend outwardly from the chopping reel to provide an effective cylindrical array of spaced helically extending blades which slice vertically into the soil and through any fibrous material on or within the soil surface to at an angle generally perpendicular to the line of travel, the chopping reels being independently hydraulically controlled to permit engagement of the reels at a desired soil depth or raising and disengaging the reels from the soil during any configuration of the mainframe and during any tilling operation;
    a plurality of rear disc gangs flexibly connected to the mainframe immediately and closely behind the support wheel assemblies such that the rear disc gangs extend generally beneath a rear mainframe portion and when in contact with the soil are the third working component of the implement to engage the soil as the implement travels forwardly across the soil, the rear disc gangs being adjustable independently of the front disc gangs between positions generally perpendicular to the line of travel of the implement and positions rearwardly angled from the perpendicular, each disc gang comprising a plurality of spaced, shallowly inwardly concaved discs rotating about the axles of the disc gangs to directionally engage the soil from generally parallel with to an acute angle to the line of travel; and
    whereby the frame pivoting actuator, mainframe and at least one support wheel assembly may be selectively adjusted to lower the front mainframe portion and raise the rear mainframe portion to cause the front disc gangs to be substantially engaged with the soil and the rear disc gangs to be more shallowly engaged to not engaged, and conversely may be adjusted to raise the front mainframe portion and lower the rear mainframe portion to cause the rear disc gangs to be substantially engaged with the soil and the front disc gangs to be more shallowly engaged to not engaged.

2. The universal custom agricultural field preparation implement of claim 1, further comprising:
    a plurality of harrow bar sub-assemblies supported by a plurality of lift arm sub-assemblies connected to the mainframe behind the rear disc gangs, each harrow bar sub-assembly including a plurality of harrow support plates supported from a horizontal beam portion of a lift arm sub-assembly extending rearwardly from the rear portion of the mainframe;
    a plurality of drop chains adjustably extending downwardly from each harrow support plate to support a side of a harrow bar subassembly having a plurality of harrow bars extending transversely perpendicular to the line of travel of the implement between the opposed sides of the harrow assembly, each harrow bar supporting a plurality of spaced spikes extending selectively and adjustably downwardly and rearwardly from the harrow bar;
    a plurality of drop bars extending downwardly from a transverse horizontal beam attached to the mainframe and a front support chain extending downwardly and rearwardly from each drop bar, the front support chain being attached to the front end of a side of a harrow bar subassembly to provide a forward pulling force on the harrow subassembly when the harrow is engaged with the soil during operation of the implement; whereby
    the harrow bar sub-assembly can be lowered from or raised toward the support plate by adjustably engaging appropriate links of the drop chains in slots in the support plate to control the depth of soil engagement and conversely to prevent soil engagement for a selected configuration of the implement, whereby engagement of the soil by the harrow subassembly during tillage will cause the soil behind the rear disc gangs to be leveled and smoothed.

3. The universal custom agricultural field preparation implement of claim 2, further comprising:

a plurality of pivoting rolling basket support arm assemblies each supported from a lift arm subassembly horizontal beam portion, each rolling basket support arm assembly having an upper triangular plate pivotally connected to the horizontal beam portion and is spring-biased forwardly toward its normal operation position;

a basket lift arm pivotally attached to a lower corner of the triangular plate, and having a lower arm section which engages an end of a conventional rolling basket in rotatable relation;

a turnbuckle link is pinned at its top end to a rear corner of the triangular plate and at its lower end to the lower arm section of the basket lift arm, the turnbuckle link being adapted to be lengthened or shortened by turning a threaded section to regulate the vertical distance of the basket to the horizontal beam portion of the lift arm subassembly; whereby the pivoting rolling basket will be biased by the spring to pressure the rolling basket against the soil directly behind a harrow-bar sub assembly to effectively break up clumps of soil and roots and pack down the soil to provide an acceptable seed bed.

4. The universal custom agricultural field preparation implement of claim 1, further comprising:

a hydraulic actuated first side wing assembly hingedly attached to each side of the mainframe, each said wing assembly having working components including front disc gangs, chopping reel assemblies, support wheel assemblies and rear disc gangs connected thereto in a similar manner and configuration to those connected to the main frame to effectively triple the working width of the implement.

5. The universal custom agricultural field preparation implement of claim 4, further comprising:

a hydraulic actuated second side wing assembly is pivotally attached to the outward side of each first side wing assembly, each said second side wing assembly having working components including front disc gangs, chopping reel assemblies, support wheel assemblies and rear disc gangs connected thereto in a similar manner and configuration to those connected to the main frame and to the first side wing assembly to effectively increase the working width of the single side wings implement by an additional approximately one-third; and wherein the two pivotally connected pairs of first and second side wing assemblies may be pivoted into a nearly parallel relationship and may then be hingedly pivoted to a travel position above the implement mainframe.

6. The universal custom agricultural field preparation implement of claim 4, further comprising:

a castoring gauge wheel assembly connected to and forwardly projecting from the outer end portion of the front disc support beam of each side wing assembly, each castoring gauge wheel assembly further comprising:

a beam engagement plate coupled to the front side of an adjacent front disc support beam;

an upper support arm and a lower support arm pivotally connected to the beam engagement plate in spaced relation;

the distal ends of the upper and lower support arms pivotally connected to a castor assembly in spaced relation, which spaced relation is equal in length to the length between their connections to the upper support arm to create a parallelogram linkage between the beam engagement plate and the castor assembly;

a castor arm having a pivot shaft rotatably engaged within the castor assembly and a stub axle at its lower end on which a castor wheel is mounted to provide a rotatable castor wheel capable of leading the path of travel of the outer end portion of the associated disc gang up and over variable terrain and through directional changes of the implement;

a castor assembly attachment post extends upwardly from the castor assembly to pivotally engage the end of a linear actuator which is pivotally attached at its other end to a post extending upwardly from the beam engagement plate, whereby the parallelogram linkage maintains the pivot shaft of the castor arm parallel to the generally vertical front surface of the front disc support beam, and the lineal actuator can be shortened and lengthened as required to adjustably and respectively raise and lower the castor wheel with respect to the associated disc gang to minimize gouging of the terrain beneath the outer end of the front disc support beam.

7. The universal custom agricultural field preparation implement of claim 5, further comprising:

a castoring gauge wheel assembly connected to and forwardly projecting from the outer end portions of the front disc support beam of each side wing assembly, each castoring gauge wheel assembly further comprising:

a beam engagement plate bolted to the front side of an adjacent front disc support beam;

an upper support arm and a lower support arm pivotally connected to the beam engagement plate in spaced relation;

the distal ends of the upper and lower support arms pivotally connected to a castor assembly in spaced relation, which spaced relation is equal in length to the length between their connections to the upper support arm to create a parallelogram linkage between the beam engagement plate and the castor assembly;

a castor arm having a pivot shaft rotatably engaged within the castor assembly and a stub axle at its lower end on which a castor wheel is mounted to provide a rotatable castor wheel capable of leading the path of travel of the outer end portion of the associated disc gang up and over variable terrain and through directional changes of the implement;

a castor assembly attachment post extends upwardly from the castor assembly to pivotally engage the end of a linear actuator which is pivotally attached at its other end to a post extending upwardly from the beam engagement plate, whereby the parallelogram linkage maintains the pivot shaft of the castor arm parallel to the generally vertical front surface of the associated front disc support beam, and the lineal actuator can be shortened and lengthened as required to adjustably and respectively raise and lower the castor wheel with respect to the associated disc gang to minimize gouging of the terrain beneath the outer end of the associated front disc support beam.

8. The universal custom agricultural field preparation implement of claim 2, wherein the lift arm subassemblies are pivotally attached to the rear ends of the mainframe, and hydraulic actuators are provided for lifting and lowering the lift arm assemblies for on-the-fly operation by an equipment operator to independently disengage and engage the harrow bar subassemblies during tillage operations.

9. The universal custom agricultural field preparation implement of claim 3, wherein the lift arm subassemblies are pivotally attached to the rear ends of the mainframe, and hydraulic actuators are provided for lifting and lowering the lift arm assemblies for on-the-fly operation by an equipment operator to independently disengage and engage the harrow bar subassemblies and the pivoting rolling basket support arm assemblies during tillage operations.

10. The universal custom agricultural field preparation implement of claim 1, wherein the plurality of front disc gangs and the plurality of rear disc gangs are each independently adjustable between operating angles by hydraulic actuators by which a tractor operator can independently on-the-fly from the seat of a tractor pulling the implement selectively increase and decrease the operating angles of the front disc gangs between positions generally perpendicular to the line of travel of the implement and positions forwardly angled from the perpendicular, and by which the tractor operator can independently selectively increase and decrease the operating angles of the rear disc gangs between positions generally perpendicular to the line of travel of the implement and positions rearwardly angled from the perpendicular.

11. The universal custom agricultural field preparation implement of claim 1, wherein the frame pivoting actuator of the tongue assembly is hydraulically actuated to be shortened or lengthened as required to pivot the mainframe about the support wheels.

12. The universal custom agricultural field preparation implement of claim 1, wherein the frame pivoting actuator of the tongue assembly is turnbuckle actuated to be shortened or lengthened as required to pivot the mainframe about the support wheels.

* * * * *

UNITED STATES PATENT AND TRADEMARK OFFICE
CERTIFICATE OF CORRECTION

PATENT NO. : 9,474,197 B2  
APPLICATION NO. : 14/216642  
DATED : October 25, 2016  
INVENTOR(S) : Kohn et al.

It is certified that error appears in the above-identified patent and that said Letters Patent is hereby corrected as shown below:

In the Specification

In Column 10, Line 15, delete "gang 51" and insert -- gang 50 --, therefor.

In the Claims

In Column 20, Line 15, in Claim 6, delete "lineal" and insert -- linear --, therefor.

In Column 20, Line 54, in Claim 7, delete "lineal" and insert -- linear --, therefor.

Signed and Sealed this  
Eighth Day of August, 2017

Joseph Matal  
*Performing the Functions and Duties of the*  
*Under Secretary of Commerce for Intellectual Property and*  
*Director of the United States Patent and Trademark Office*